(12) United States Patent
Hamadate et al.

(10) Patent No.: US 12,049,966 B2
(45) Date of Patent: Jul. 30, 2024

(54) REFRIGERANT PIPE AND REFRIGERATION APPARATUS

(71) Applicant: DAIKIN INDUSTRIES, LTD., Osaka (JP)

(72) Inventors: Junichi Hamadate, Osaka (JP); Masanori Jindou, Osaka (JP); Yoshihiro Teramoto, Osaka (JP); Hiroaki Matsuda, Osaka (JP); Masato Okuno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 185 days.

(21) Appl. No.: 17/587,575

(22) Filed: Jan. 28, 2022

(65) Prior Publication Data

US 2022/0154856 A1 May 19, 2022

Related U.S. Application Data

(63) Continuation of application No. PCT/JP2020/024495, filed on Jun. 23, 2020.

(30) Foreign Application Priority Data

Jul. 31, 2019 (JP) .................................. 2019-141532
Dec. 25, 2019 (JP) .................................. 2019-234286

(51) Int. Cl.
*F16L 33/08* (2006.01)
*F16L 13/08* (2006.01)
*F25B 41/40* (2021.01)

(52) U.S. Cl.
CPC .............. *F16L 13/08* (2013.01); *F25B 41/40* (2021.01)

(58) Field of Classification Search
CPC ........ F25B 41/40; F16L 13/08; F16L 25/0072; F16L 13/007
See application file for complete search history.

(56) References Cited

U.S. PATENT DOCUMENTS

| 260,580 | A | * | 7/1882 | Knight | .................... | F16L 13/08 |
| | | | | | | 285/285.1 |
| 300,005 | A | * | 6/1884 | Patterson | ................ | F16L 13/08 |
| | | | | | | 285/289.1 |

(Continued)

FOREIGN PATENT DOCUMENTS

| CN | 203083215 U | 7/2013 |
| CN | 205102463 U | 3/2016 |

(Continued)

OTHER PUBLICATIONS

International Search Report issued in corresponding International Patent Application No. PCT/JP2020/024495 mailed Sep. 8, 2020 (5 pages).

(Continued)

*Primary Examiner* — Zachary T Dragicevich
*Assistant Examiner* — James A Linford
(74) *Attorney, Agent, or Firm* — Osha Bergman Watanabe & Burton LLP

(57) ABSTRACT

A refrigerant pipe that constitutes a refrigerant circuit of a refrigeration apparatus includes: a first pipe; and a second pipe. The first pipe includes: a first pipe body, made of stainless steel; and a first connection, made of a material different from stainless steel, disposed at an end of the first pipe body in a pipe axial direction of the first pipe body. The second pipe includes: a second pipe body, made of stainless steel; and a second connection, made of a material identical to the material of the first connection, disposed at an end of the second pipe body in a pipe axial direction of the second (Continued)

pipe body. The first connection is connected to the second connection.

15 Claims, 19 Drawing Sheets

(56) References Cited

U.S. PATENT DOCUMENTS

| | | | | |
|---|---|---|---|---|
| 468,298 | A * | 2/1892 | White et al. | F16L 13/08 |
| | | | | 285/289.1 |
| 909,725 | A * | 1/1909 | Williams | F16L 13/08 |
| | | | | 285/285.1 |
| 986,164 | A * | 3/1911 | Glennan | F16L 13/08 |
| | | | | 285/422 |
| 8,876,425 | B2 | 11/2014 | Wilson | |
| 2014/0016995 | A1* | 1/2014 | Wilson | F16L 13/007 |
| | | | | 156/60 |
| 2016/0290741 | A1* | 10/2016 | Boyd | B23K 1/0012 |
| 2016/0312923 | A1 | 10/2016 | Shi | |
| 2018/0080692 | A1 | 3/2018 | Honda et al. | |
| 2018/0209707 | A1 | 7/2018 | Aoki et al. | |

FOREIGN PATENT DOCUMENTS

| | | |
|---|---|---|
| CN | 106051331 A | 10/2016 |
| CN | 208442416 U | 1/2019 |
| JP | S61-106120 A | 5/1986 |
| JP | H07-080633 A | 3/1995 |
| JP | 2005-121131 A | 5/2005 |
| JP | 2010-151327 A | 7/2010 |
| JP | 2016-205610 A | 12/2016 |
| KR | 20160020313 A | 2/2016 |

OTHER PUBLICATIONS

Extended European Search Report issued in corresponding European Patent Application No. 20848198.6, dated Aug. 2, 2022 (9 pages).

International Preliminary Report on Patentability issued in corresponding International Application No. PCT/JP2020/024495 issued Feb. 1, 2022 (6 pages).

* cited by examiner

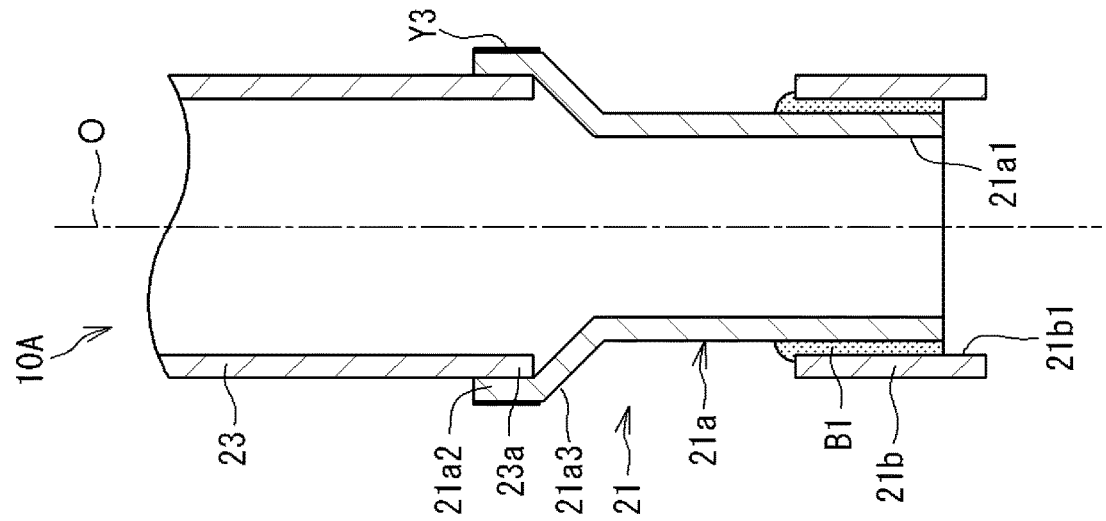
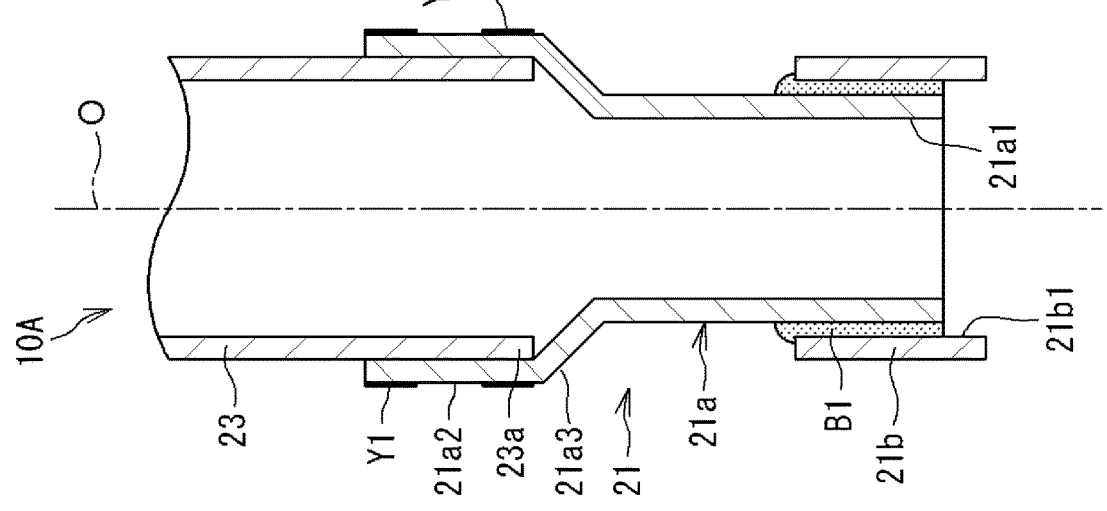
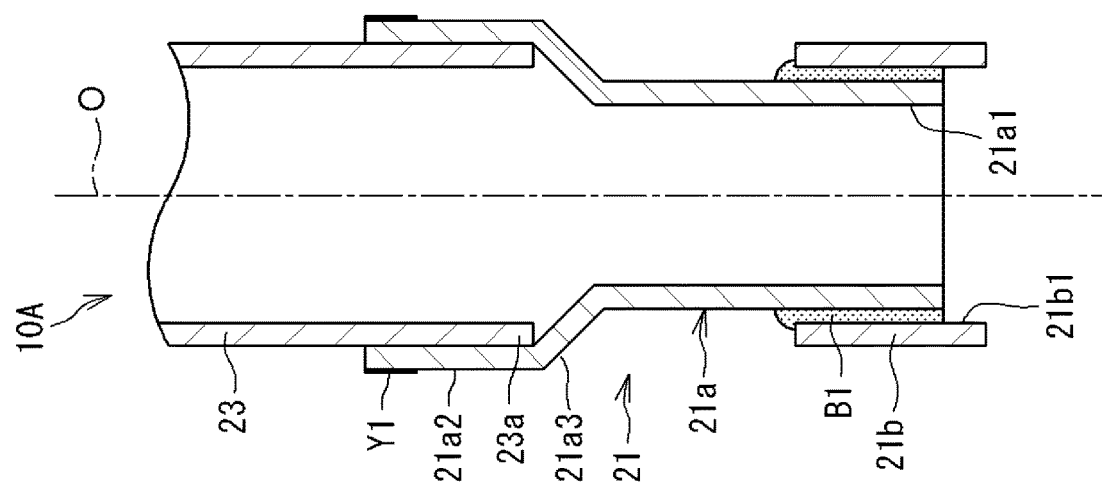

FIG. 8A
FIG. 8B
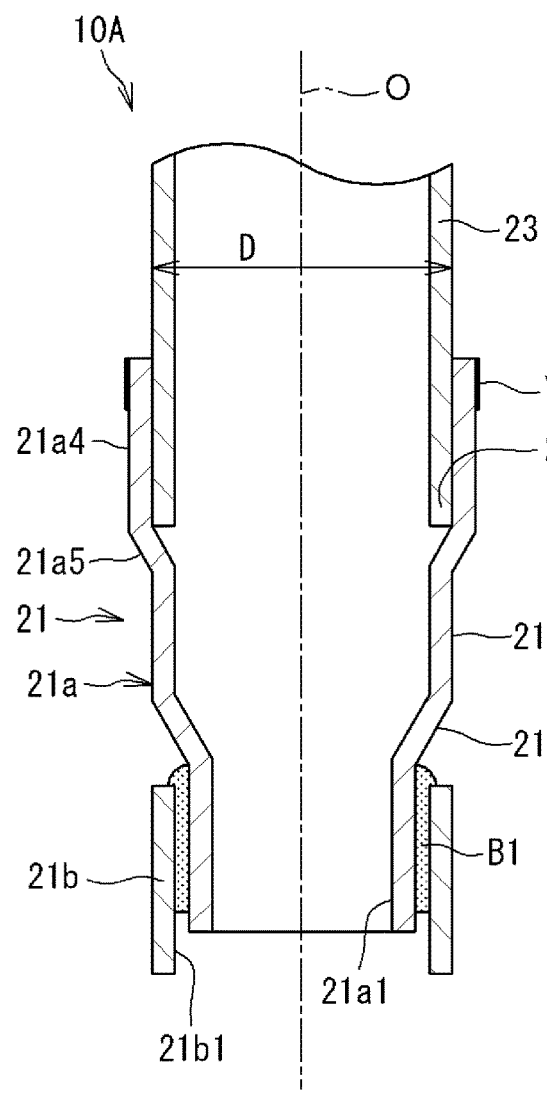
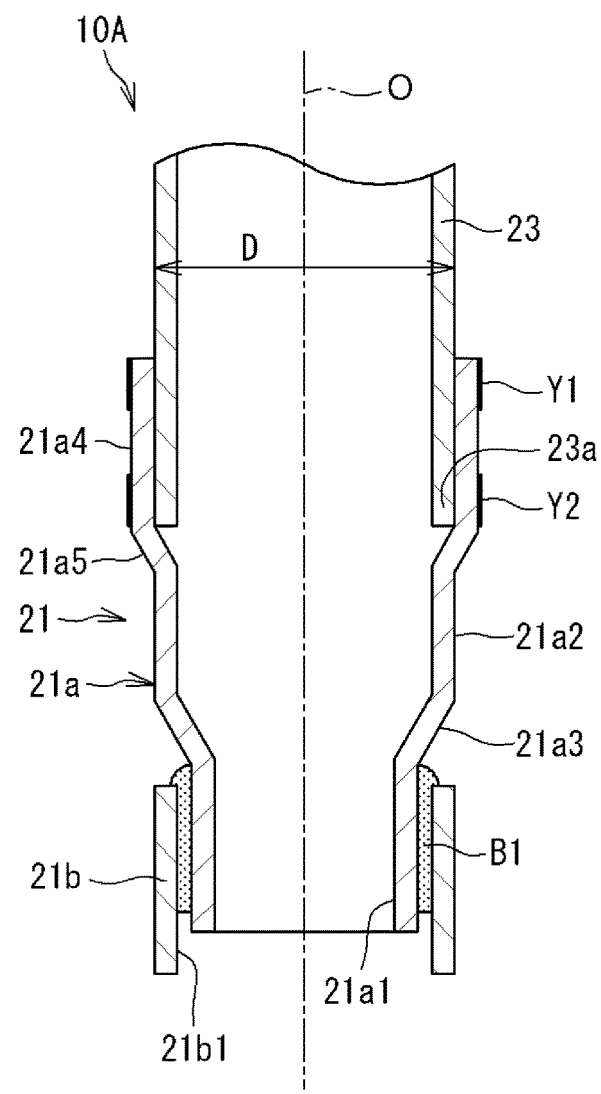

REFRIGERANT PIPE AND REFRIGERATION APPARATUS

TECHNICAL FIELD

The present disclosure relates to a refrigerant pipe and a refrigeration apparatus.

BACKGROUND

A heat-pump refrigeration apparatus such as an air conditioner includes a refrigerant circuit formed by connecting, with a refrigerant pipe, element components such as a compressor, an oil separator, a four-way switching valve, a heat source-side heat exchanger, an expansion mechanism, a usage-side heat exchanger, an accumulator, and a shutoff valve. In general, a copper pipe easily processed by bending or the like is used for the refrigerant pipe. However, since a material cost of a copper pipe is high, it is considered to use relatively inexpensive stainless steel as a material of the refrigerant pipe (see, for example, Patent Literature 1).

PATENT LITERATURE

Patent Literature 1: Japanese Unexamined Patent Publication No. 2010-151327

SUMMARY

A refrigerant pipe of the present disclosure constitutes a refrigerant circuit of a refrigeration apparatus, the refrigerant pipe including a first pipe, and a second pipe, in which the first pipe includes a first pipe body including stainless steel and a first connection provided at an end of the first pipe body in a pipe axial direction and including a material different from stainless steel, the second pipe includes a second pipe body including stainless steel and a second connection provided at an end of the second pipe body in the pipe axial direction and including a material that is same as the material of the first connection, and the first connection and the second connection are connected to each other.

BRIEF DESCRIPTION OF THE DRAWINGS

FIGS. 6A, 6B, and 6C are sectional views illustrating a modification of the first pipe body.

FIGS. 8A and 8B are sectional views illustrating a further modification of the first pipe body.

DETAILED DESCRIPTION

Hereinafter, embodiments of the present disclosure will be described in detail with reference to the accompanying drawings.

Overall Configuration of Refrigeration Apparatus

One or more embodiments of the present disclosure will be described below with reference to the drawings.

Figure 1:
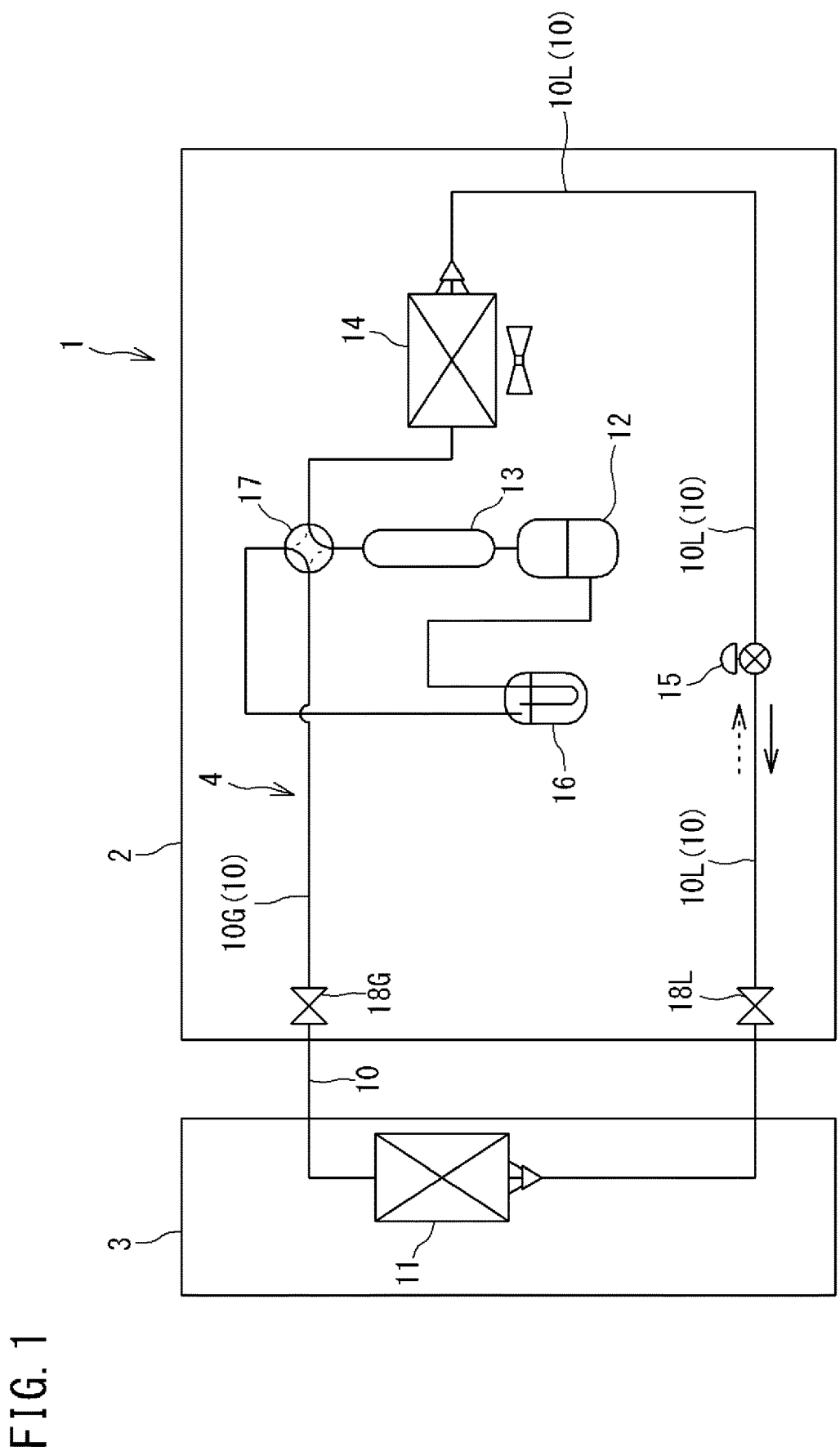
FIG. 1 is a schematic configuration diagram of a refrigeration apparatus including a refrigerant pipe according to one or more embodiments.

FIG. 1 is a schematic configuration diagram of a refrigeration apparatus including a refrigerant pipe according to one or more embodiments.

A refrigeration apparatus 1 is, for example, an air conditioner that adjusts indoor temperature and humidity, and includes an outdoor unit 2 installed outdoors and an indoor unit 3 installed indoor. The outdoor unit 2 and the indoor unit 3 are connected to each other by a refrigerant pipe 10.

The refrigeration apparatus 1 includes a refrigerant circuit 4 that performs a vapor compression refrigeration cycle. The refrigerant circuit 4 includes a plurality of element components and a refrigerant pipe 10 connecting the plurality of element components. The refrigerant circuit 4 includes, as element components, an indoor heat exchanger 11, a compressor 12, a muffler 13, an outdoor heat exchanger 14, an expansion mechanism 15, an accumulator 16, a four-way switching valve (switching mechanism) 17, shutoff valves 18L and 18G, and the like, which are connected by the refrigerant pipe 10. The refrigerant pipe 10 includes a liquid pipe 10L and a gas pipe 10G. The liquid pipe 10L and the gas pipe 10G are provided with the shutoff valves 18L and 18G, respectively.

The indoor heat exchanger 11 is provided in the indoor unit 3 and exchanges heat between refrigerant and indoor air. As the indoor heat exchanger 11, for example, a cross-fin fin-and-tube heat exchanger, a microchannel heat exchanger, or the like can be adopted. An indoor fan (not shown) that blows indoor air to the indoor heat exchanger 11 and sends conditioned air to the room is provided near the indoor heat exchanger 11.

The compressor 12, the muffler 13, the outdoor heat exchanger 14, the expansion mechanism 15, the accumulator 16, the four-way switching valve 17, and the shutoff valves 18L and 18G are provided in the outdoor unit 2. The compressor 12 compresses refrigerant sucked from a suction pipe and discharges the refrigerant from a discharge pipe. As the compressor 12, for example, various compressors such as a scroll compressor can be adopted.

The muffler 13 suppresses pressure pulsation of the refrigerant discharged from the compressor 12. Instead of or in addition to the muffler 13, an oil separator may be provided between the discharge pipe of the compressor 12 and the four-way switching valve 17. The oil separator separates lubricating oil from a mixed fluid of the lubricating oil and the refrigerant discharged from the compressor 12.

The outdoor heat exchanger 14 exchanges heat between the refrigerant and the outdoor air. As the outdoor heat exchanger 14, for example, a cross-fin fin-and-tube heat exchanger, a microchannel heat exchanger, or the like can be adopted. An outdoor fan that sends the outdoor air to the outdoor heat exchanger 14 is provided near the outdoor heat exchanger 14.

The expansion mechanism 15 is disposed between the outdoor heat exchanger 14 and the indoor heat exchanger 11 in the refrigerant pipe 10 of the refrigerant circuit 4, and expands the inflowing refrigerant to decompress the refrigerant to a predetermined pressure. As the expansion mechanism 15, for example, an electronic expansion valve with a variable opening degree or a capillary tube can be employed.

The accumulator 16 is disposed between a suction port of the compressor 12 and the four-way switching valve 17 in the refrigerant circuit 4, and separates the flowing refrigerant into gas and liquid. The gas refrigerant separated in the accumulator 16 is sucked into the compressor 12.

The four-way switching valve 17 can be switched between a first state indicated by a solid line and a second state indicated by a broken line in FIG. 1. When the refrigeration apparatus 1 performs a cooling operation, the four-way switching valve 17 is switched to the first state, and when the refrigeration apparatus 1 performs a heating operation, the four-way switching valve 17 is switched to the second state.

Configuration of Refrigerant Pipe

Figure 2:
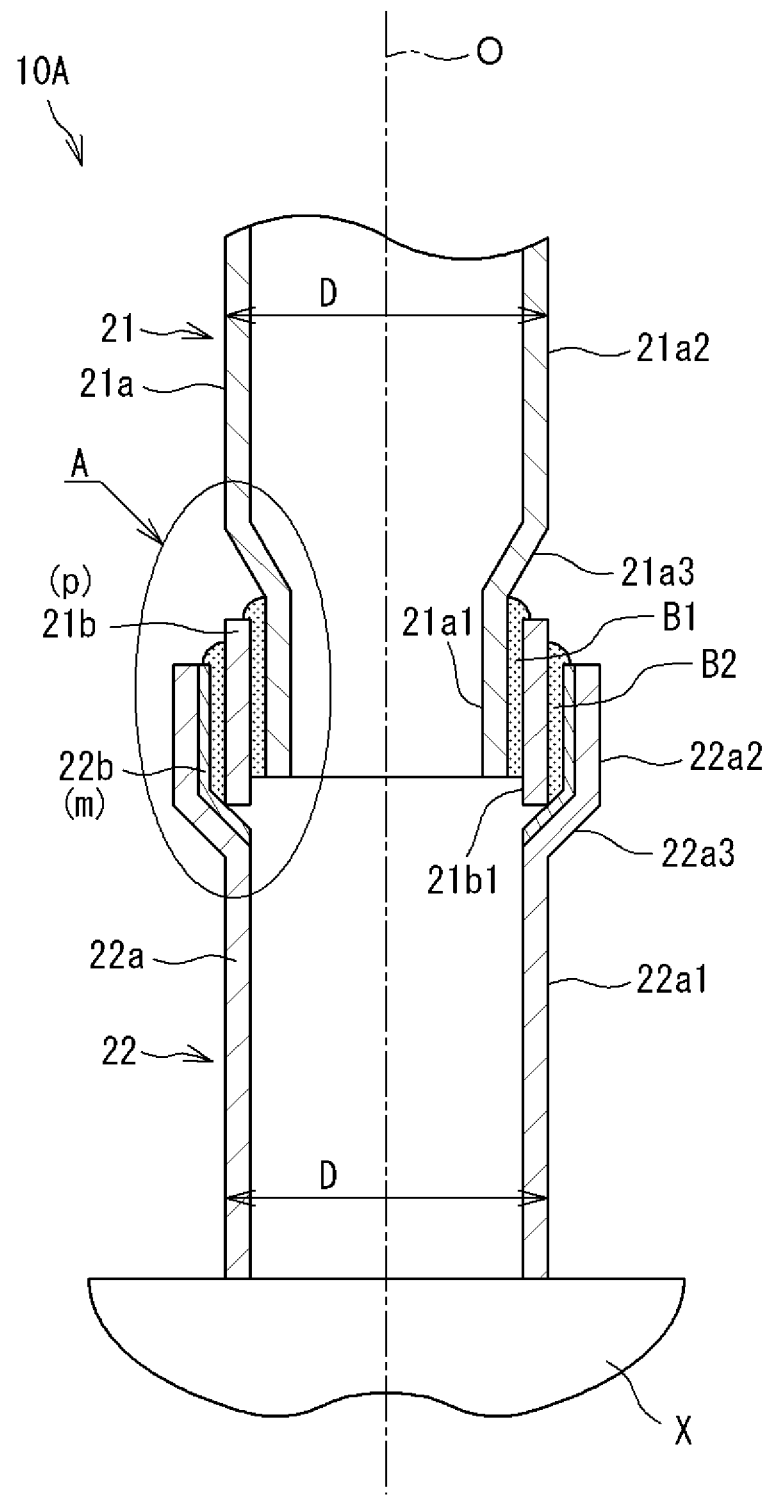
FIG. 2 is a sectional view illustrating a connected portion between a first pipe and a second pipe of the refrigerant pipe.

FIG. 2 is a sectional view illustrating a connected portion between a first pipe and a second pipe of a refrigerant pipe.

A refrigerant pipe 10A illustrated in FIG. 2 is connected to at least one element component X among the plurality of element components described above. The refrigerant pipe 10A includes a first pipe 21 and a second pipe 22. The first pipe 21 and the second pipe 22 have an identical axis O. In one or more embodiments, the axis O is disposed in an up-down direction (vertical direction). In the following description, a direction along the axis O is also referred to as a "pipe axial direction". A radial direction around the axis O is also referred to as a "pipe radial direction".

First Pipe

The first pipe 21 includes a first pipe body 21a and a first connection 21b.

The first pipe body 21a includes stainless steel. The first pipe body 21a includes, for example, SUS304, SUS304L, SUS436L, SUS430, or the like.

The first pipe body 21a has a first large diameter portion 21a2, a first step portion 21a3, and a first small diameter portion 21a1 arranged in the pipe axial direction. In an example illustrated in FIG. 2, the first small diameter portion 21a1 is disposed at one end (lower part) of the first pipe body 21a in the pipe axial direction. The first step portion 21a3 is disposed above the first small diameter portion 21a1. The first large diameter portion 21a2 is disposed above the first small diameter portion 21a1.

In the first pipe body 21a, the first small diameter portion 21a1 and the first step portion 21a3 are formed by reducing one end in the pipe axial direction of the pipe having an outer diameter D in the pipe radial direction, and a part where a diameter of the pipe is not reduced is defined as the first large diameter portion 21a2.

The first connection 21b includes a tube separate from the first pipe body 21a. Hereinafter, the first connection 21b is also referred to as a "first connection pipe". In FIG. 2, (p) representing "pipe" is assigned to the first connection pipe 21b. The first connection pipe 21b includes a material different from a material of the first pipe body 21a. The first connection pipe 21b according to one or more embodiments includes copper. The "copper" described herein is "pure copper" containing copper as a main component in an amount of 99.9 wt % or more. The first connection pipe 21b is a straight pipe having a constant outer diameter and inner diameter. A length of the first connection pipe 21b in the pipe axial direction is shorter than a length of the first pipe body 21a in the pipe axial direction. The length of the first connection pipe 21b in the pipe axial direction is longer than a length of the first small diameter portion 21a1 of the first pipe body 21a in the pipe axial direction. The inner diameter of the first connection pipe 21b is slightly larger than the outer diameter of the first small diameter portion 21a1.

The first small diameter portion 21a1 of the first pipe body 21a is inserted inside the first connection pipe 21b in the pipe radial direction. An inner peripheral surface of the first connection pipe 21b and an outer peripheral surface of the first small diameter portion 21a1 are disposed to face each other in the pipe radial direction. The inner peripheral surface of the first connection pipe 21b and the outer peripheral surface of the first small diameter portion 21a1 are brazed with a first brazing material B1. In FIG. 2, a thickness of the first brazing material B1 in the pipe radial direction is exaggerated in order to clearly show a brazed portion. The same applies to a second brazing material B2 described later. In FIGS. 3 to 16, thicknesses of the brazing materials B1 and B2 in the pipe radial direction are similarly exaggerated.

Figure 3:
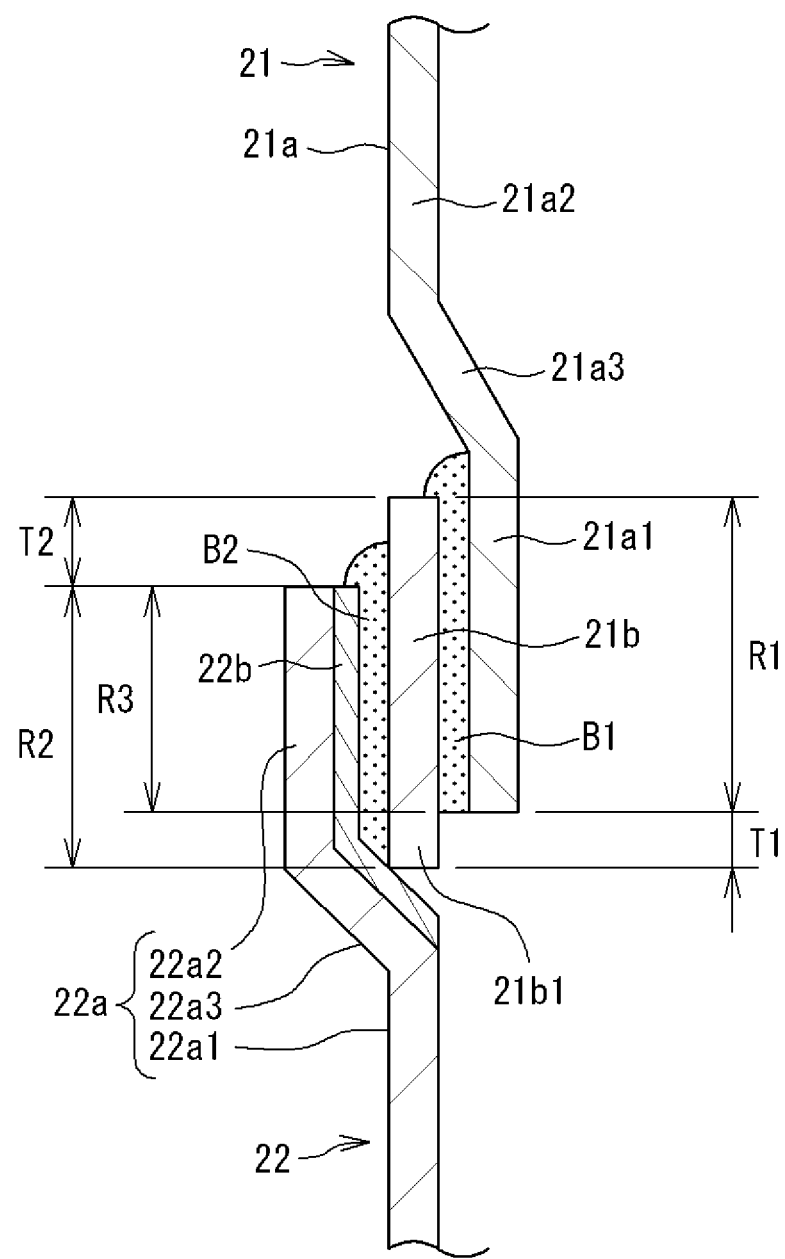
FIG. 3 is an enlarged sectional view of a portion A in FIG. 2.

FIG. 3 is an enlarged view of the portion A in FIG. 2.

The inner peripheral surface of the first connection pipe 21b and the outer peripheral surface of the first small diameter portion 21a1 are connected to each other by "in-furnace brazing". This is for the following reason.

First, since a passive film (oxide film) is formed on a surface of stainless steel as a material of the first pipe body 21a, a flux for removing the oxide film is required to perform manual brazing (hereinafter, also referred to as "hand brazing") such as torch brazing. Since the refrigerant flows in the refrigerant circuit 4 as a closed circuit, if the flux remains in the refrigerant pipe 10A, the flux may be mixed in the refrigerant, and the mixture may adversely affect performance of the refrigerant or the element component X (for example, the compressor 12) into which the refrigerant flows. Therefore, an operation of removing the flux after brazing is required.

The stainless steel as a material of the first pipe body 21a causes embrittlement called sensitization when heated. Sensitization is a phenomenon in which chromium binds to carbon in stainless steel, and the chromium is precipitated at a grain boundary, and thus a part having a low chromium component is generated to reduce corrosion resistance or the like. A temperature range in which the sensitization is likely to occur and an application time of the heat are known.

The in-furnace brazing is a method of performing brazing in a predetermined gas atmosphere, for example, a hydrogen gas atmosphere capable of removing an oxide film inside a continuous furnace or the like. It is therefore possible to braze the stainless steel without using a flux. This eliminates the need for removing the flux after brazing. In the in-furnace brazing, it is easy to manage a brazing temperature and a brazing time, and thus the brazing can be performed at a temperature and time that can suppress occurrence of sensitization. By using SUS304L having a smaller carbon amount than SUS304, as the first pipe body 21a, sensitization of the first pipe body 21a can be suppressed.

As illustrated in FIG. 3, the first connection pipe 21b has a protrusion 21b1 protruding in the pipe axial direction from the first small diameter portion 21a1 as an end of the first pipe body 21a. A protrusion amount T1 of the protrusion 21b1 is, for example, 0.1 mm or more and 25 mm or less. The protrusion amount T1 may be 1.0 mm or more and 5.0 mm or less. The protrusion amount T1 may be 2.0 mm or more and 3.0 mm or less. The protrusion amount T1 according to one or more embodiments is smaller than an overlap amount R1 of the first pipe body 21a and the first connection pipe 21b in the pipe radial direction. The overlap amount R1 is, for example, 7.0 mm.

Second Pipe

As illustrated in FIGS. 2 and 3, the second pipe 22 is connected to one end (lower part) of the first pipe 21 in the pipe axial direction. The second pipe 22 protrudes from the element component X such as the compressor 12, constitutes a part of the element component X, and constitutes a part of the refrigerant pipe 10A. The second pipe 22 according to one or more embodiments includes a second pipe body 22a and a second connection 22b.

The second pipe body 22a includes stainless steel which is the same material as the material of the first pipe body 21a of the first pipe 21. The second pipe body 22a has a second large diameter portion 22a2, a second step portion 22a3, and a second small diameter portion 22a1 arranged in the pipe axial direction. The second large diameter portion 22a2 is disposed at one end (upper part) of the second pipe body 22a in the pipe axial direction. The second small diameter portion 22a1 is disposed at the other end (lower part) of the second pipe body 22a in the pipe axial direction. A lower end of the second small diameter portion 22a1 is directly connected and fixed to the element component X. The second step portion 22a3 is disposed between the second large diameter portion 22a2 and the second small diameter portion 22a1.

In the second pipe body 22a, the second large diameter portion 22a2 and the second step portion 22a3 are formed by enlarging one end of a pipe having the outer diameter D in the pipe radial direction, and a part where a diameter of the pipe is not enlarged is defined as the second small diameter portion 22a1.

The second connection 22b includes a plating layer provided on inner peripheral surfaces of the second large diameter portion 22a2 and the second step portion 22a3 of the second pipe body 22a. The second connection 22b includes a material different from the material of the second pipe body 22a and the same as the material of the first connection pipe 21b. The second connection 22b according to one or more embodiments includes copper. In FIG. 2, (m) representing a "plating layer" is assigned to the second connection 22b.

The second large diameter portion 22a2 of the second pipe body 22a is disposed such that an opening faces upward. An inner diameter of the second large diameter portion 22a2 is slightly larger than the outer diameter of the first connection pipe 21b in the first pipe 21. The first connection pipe 21b of the first pipe 21 is inserted inside the second large diameter portion 22a2 in the pipe radial direction. The second connection 22b provided on an inner peripheral surface of the second large diameter portion 22a2 and an outer peripheral surface of the first connection pipe 21b are disposed to face each other in the pipe radial direction. The protrusion 21b1 of the first connection pipe 21b is in contact with the second step portion 22a3 (substantially, the plating layer (second connection 22b) provided on the second step portion 22a3) of the second pipe body 22a.

The second connection 22b and the first connection pipe 21b are brazed by the second brazing material B2. This brazing is hand brazing such as torch brazing (burner brazing). Since both the first connection pipe 21b and the second connection 22b include copper, they can be easily connected to each other by brazing using an inexpensive brazing material such as phosphor copper brazing.

The first pipe 21 and the second pipe 22 are relatively positioned in the pipe axial direction by the protrusion 21b1 of the first connection pipe 21b being in contact with the second step portion 22a3 of the second pipe body 22a. Accordingly, the brazing can be performed more easily.

As illustrated in FIG. 3, the first connection pipe 21b overlaps the second pipe body 22a in the pipe radial direction in a range indicated by R2. The overlap amount R2 has substantially the same dimension as the overlap amount R1 between the first connection pipe 21b and the first pipe body 21a. The first connection pipe 21b protrudes from the second pipe body 22a in the pipe axial direction. The protrusion amount T2 of the first connection pipe 21b is smaller than the overlap amount R2. The protrusion amount T2 is, for example, 2 mm or more and 3 mm or less.

A lower end of the first pipe body 21a and an upper end of the second pipe body 22a overlap each other in the pipe radial direction. An overlap amount R3 between the first pipe body 21a and the second pipe body 22a is, for example, 5.0 mm. The first connection pipe 21b is placed under a high-temperature environment in a furnace during brazing with the first pipe body 21a. Thus, a strength of the first connection pipe 21b may decrease due to coarsening of crystal grains of copper. In one or more embodiments, since the first pipe body 21a and the second pipe body 22a including stainless steel are disposed to overlap each other in the pipe radial direction, the first connection pipe 21b having a reduced strength does not exist alone in the refrigerant pipe 10A. In other words, the first connection pipe 21b overlaps at least one of the first pipe body 21a or the second pipe body 22a in the pipe radial direction. Therefore, a decrease in the strength of the first connection pipe 21b is compensated by the first pipe body 21a and the second pipe body 22a.

In one or more embodiments, the first connection pipe 21b has the protrusion 21b1 protruding from the first pipe body 21a in the pipe axial direction. However, in FIG. 3, assuming that the first connection pipe 21b is shorter in the pipe axial direction and the first connection pipe 21b is retracted upward without protruding from the first pipe body 21a, there will be a slight space between the second large diameter portion 22a2 of a second pipe 122 and the lower end of the first small diameter portion 21a1 of a first pipe 121 in the pipe radial direction, and the overlap amount R2 between a first connection pipe 121b and the second pipe 122 will be also reduced. Therefore, there is a possibility that a connection strength between the first connection pipe 121b and the second pipe 122 decreases.

In one or more embodiments, as shown in FIG. 3, since the first connection pipe 21b has the protrusion 21b1 protruding from the first pipe body 21a in the pipe axial direction, there is no space between the second pipe 22 and the first pipe 21, the overlap amount R2 between the first connection pipe 21b and the second pipe body 22a is also increased, and the connection strength between the first pipe 21 and the second pipe 22 can be increased.

The second brazing material B2 having a melting point lower than a melting point of the first brazing material B1 is used. Thus, for example, when the element component X is replaced, by heating the connected portion between the first pipe 21 and the second pipe 22 at a temperature higher than the melting point of the second brazing material B2 and lower than the melting point of the first brazing material B1, only the second brazing material B2 is melted without melting the first brazing material B1, and the second pipe 22 can be removed from the first pipe 21. Therefore, in the first pipe 21, the first connection pipe 21b remains connected to the first pipe body 21a, and the second pipe 22 of the new element component X can be connected to the first connection pipe 21b.

The first large diameter portion 21a2 of the first pipe 21 and the second small diameter portion 22a1 of the second pipe 22 have the same outer diameter D. Therefore, in a manufacturing process of the refrigeration apparatus 1, jigs used for fixing, holding, and handling the pipes can be made common. When an inner diameter of the first large diameter portion 21a2 and an inner diameter of the second small diameter portion 22a1 are common, pressure fluctuation of the refrigerant flowing through the refrigerant pipe 10A can be reduced.

Valve Unit

Figure 17:
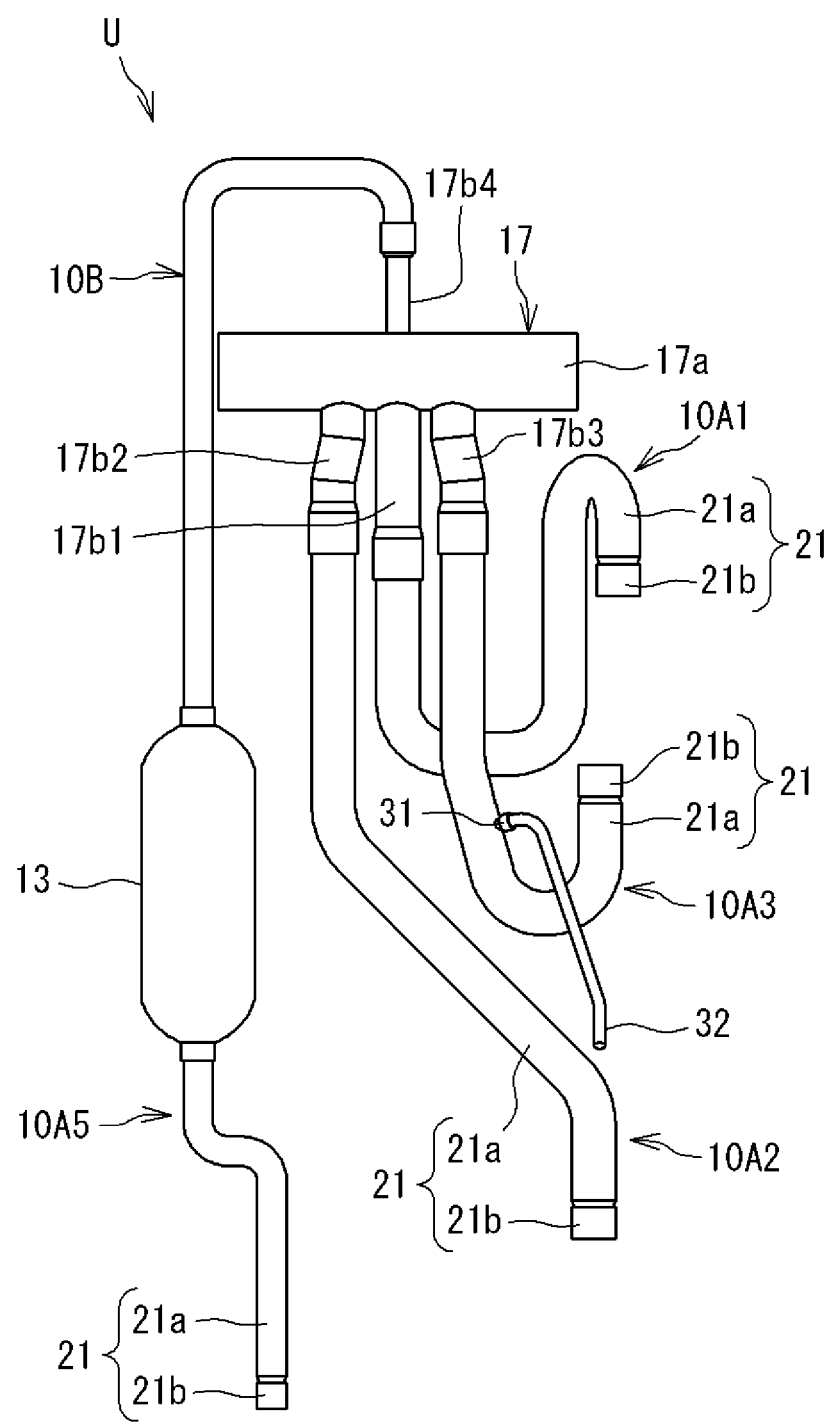
FIG. 17 is a front view illustrating a valve unit in which a four-way switching valve and the refrigerant pipe are integrated.

FIG. 17 is a front view illustrating a valve unit in which the four-way switching valve and refrigerant pipes are integrated.

The four-way switching valve 17 includes a valve main body 17a constituting an outer shell, a valve body accommodated in the valve main body 17a, and the like. The valve main body 17a includes stainless steel.

The valve main body 17a is provided with four first to fourth ports 17b1 to 17b4 each including a short pipe and constituting a refrigerant inlet and outlet. These first to fourth ports 17b1 to 17b4 include stainless steel. One ends of first to third refrigerant pipes 10A1 to 10A3 and a fourth refrigerant pipe 10B are connected to the first to fourth ports 17b1 to 17b4, respectively.

The first to third refrigerant pipes 10A1 to 10A3 are the refrigerant pipes according to one or more embodiments described with reference to FIGS. 2 and 3. The first pipe 21 of the first to third refrigerant pipes 10A1 to 10A3 includes the first pipe body 21a and the first connection pipe 21b. One end of the first pipe body 21a is connected to the three first to third ports 17b1 to 17b3. The first connection pipe 21b is provided at the other end of the first pipe body 21a. Since the first pipe body 21a includes stainless steel, a connection between each of the first to third ports 17b1 to 17b3 and the corresponding first pipe body 21a is a connection between stainless steel members.

One end of the fourth refrigerant pipe 10B is connected to the remaining one fourth port 17b4. Unlike the first to third refrigerant pipes 10A1 to 10A3, the fourth refrigerant pipe 10B includes only stainless steel. One end of the muffler 13 is connected to the other end of the fourth refrigerant pipe 10B. The muffler 13 also includes stainless steel. Accordingly, the fourth refrigerant pipe 10B and the muffler 13 are connected to each other by stainless steel.

A fifth refrigerant pipe 10A5 is connected to the other end of the muffler 13. The fifth refrigerant pipe 10A5 is the refrigerant pipe according to one or more embodiments described with reference to FIGS. 2 and 3, similarly to the first to third refrigerant pipes 10A1 to 10A3. One end of the first pipe 21 of the fifth refrigerant pipe 10A5 is connected to the other end of the muffler 13. The first connection pipe 21b is provided at the other end of the first pipe 21. Since the first pipe body 21a includes stainless steel, a connection between the muffler 13 and the first pipe body 21a is a connection between stainless steel members.

A coupling pipe 31 is attached to an outer peripheral surface of the first pipe body 21a of the third refrigerant pipe 10A3. The coupling pipe 31 includes a material different from the material of the first pipe body 21a and the same as the material of the first connection pipe 21b. The coupling pipe 31 according to one or more embodiments includes copper. Another refrigerant pipe 32 including the same material as the material of the coupling pipe 31 is connected to the coupling pipe 31. The refrigerant pipe 32 includes copper and has a smaller diameter than the first pipe body 21a.

In a valve unit U illustrated in FIG. 17, both the connection between stainless steel members and the connection between stainless steel member and copper member are performed by in-furnace brazing. In one or more embodiments, the valve unit U as a whole in which the four-way switching valve 17, the muffler 13, the refrigerant pipes 10A and 10B, and the coupling pipe 31 are temporarily assembled is introduced into a furnace, and the connected portions are simultaneously brazed in the furnace.

Since a connection between the coupling pipe 31 and the refrigerant pipe 32 is a connection between copper members, the coupling pipe 31 and the refrigerant pipe 32 are connected to each other by hand brazing instead of in-furnace brazing. The refrigerant pipe 32 is referred to as a service port, and is used for attaching a functional component such as a pressure sensor at a time of maintenance or inspection of the refrigeration apparatus 1. If the refrigerant pipe 32 includes stainless steel, the refrigerant pipe can be brazed in the furnace together with other pipes and the like as described above. However, since a diameter of the refrigerant pipe 32 is smaller than a diameter of the refrigerant pipes 10A, if the refrigerant pipe 32 includes stainless steel, there is an adverse effect that a manufacturing cost is rather increased in order to obtain predetermined accuracy. Thus, in one or more embodiments, the refrigerant pipe 32 includes copper, and only the coupling pipe 31 including copper is connected to the refrigerant pipe 10A by in-furnace brazing. As a result, the refrigerant pipe 32 can be connected to the refrigerant pipe 10A via the coupling pipe 31 by manual brazing without reducing a strength of the refrigerant pipe 32.

The coupling pipe 31 and the refrigerant pipe 32 need not be provided on the third refrigerant pipe 10A3 but may be provided on another refrigerant pipe 10A1, 10A2, 10A5, or 10A6. The coupling pipe 31 and the refrigerant pipe 32 need not be provided on the first pipe 21 but may be provided on the second pipe 22.

Figure 18:
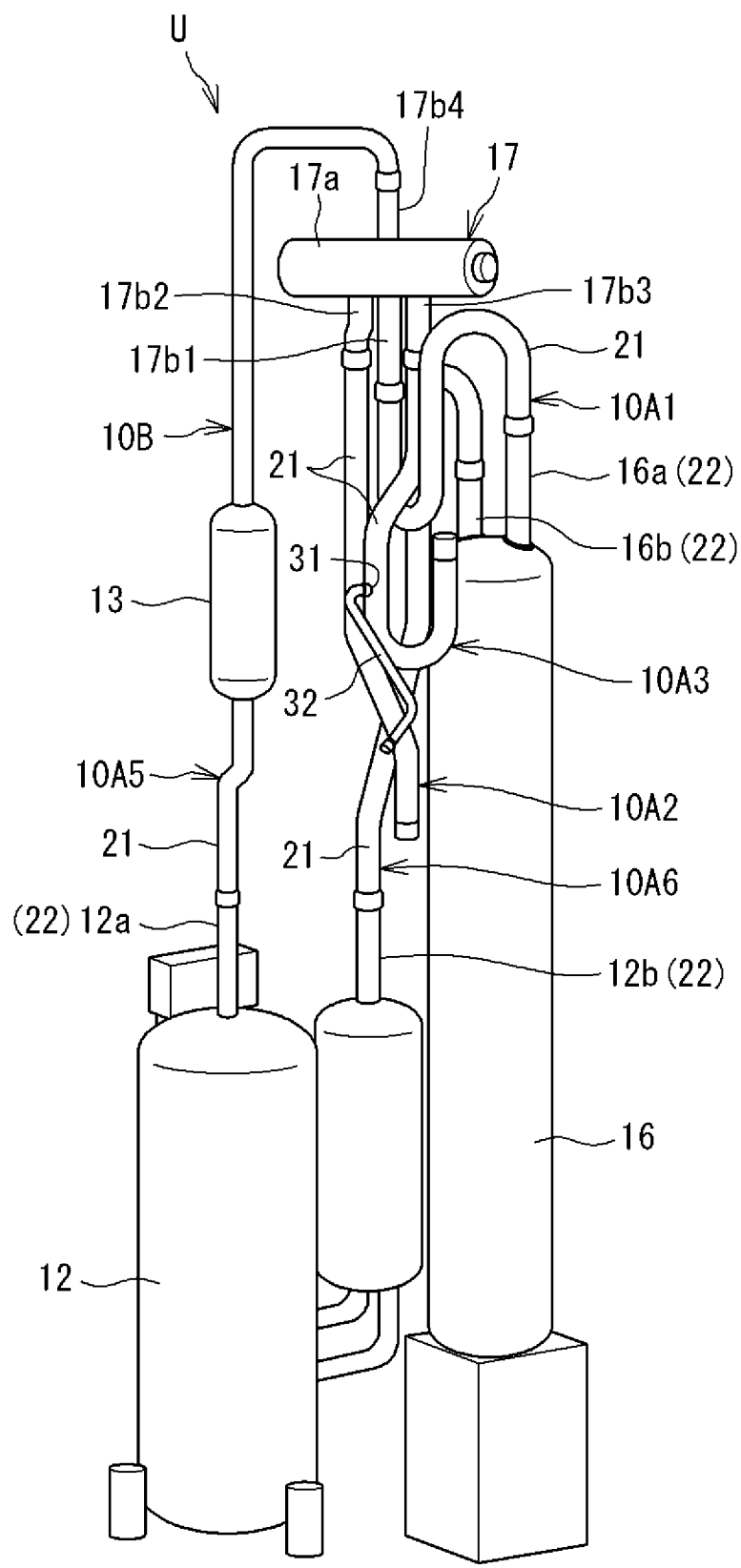
FIG. 18 is a perspective view illustrating a state in which the valve unit is connected to an element component.

FIG. 18 is a perspective view illustrating a state in which the valve unit is connected to the element component.

Specifically, FIG. 18 illustrates a state in which the valve unit U illustrated in FIG. 17 is connected to the compressor 12 as the element component X and the accumulator 16. A discharge pipe 12a of the compressor 12 is constituted by the second pipe 22 of the fifth refrigerant pipe 10A5. The first pipe 21 of the fifth refrigerant pipe 10A5 connected to the muffler 13 of the valve unit U is connected to the second pipe 22. Accordingly, the compressor 12 is connected to the four-way switching valve 17 via the fifth refrigerant pipe 10A5, the muffler 13, and the fourth refrigerant pipe 10B.

An inflow pipe 16a of the accumulator 16 constitutes the second pipe 22 of the first refrigerant pipe 10A1. The first pipe 21 of the first refrigerant pipe 10A1 is connected to the second pipe 22.

An outflow pipe 16b of the accumulator 16 and a suction pipe 12b of the compressor 12 are connected to each other by the sixth refrigerant pipe 10A6. The sixth refrigerant pipe 10A6 is not included in the valve unit U, but is the refrigerant pipe according to one or more embodiments described with reference to FIGS. 2 and 3. The outflow pipe 16b of the accumulator 16 and the suction pipe 12b of the compressor 12 both constitute the second pipe 22 of the sixth refrigerant pipe 10A6. Both ends of the first pipe 21 of the sixth refrigerant pipe 10A6 are connected to the second pipe 22 by manual brazing.

The first pipes 21 of the second and third refrigerant pipes 10A2 and 10A3 connected to the other two second and third ports 17a2 and 17a3 of the four-way switching valve 17 are connected to the shutoff valve 18G illustrated in FIG. 1 and a gas-side header of the outdoor heat exchanger 14, respectively.

Figure 19:
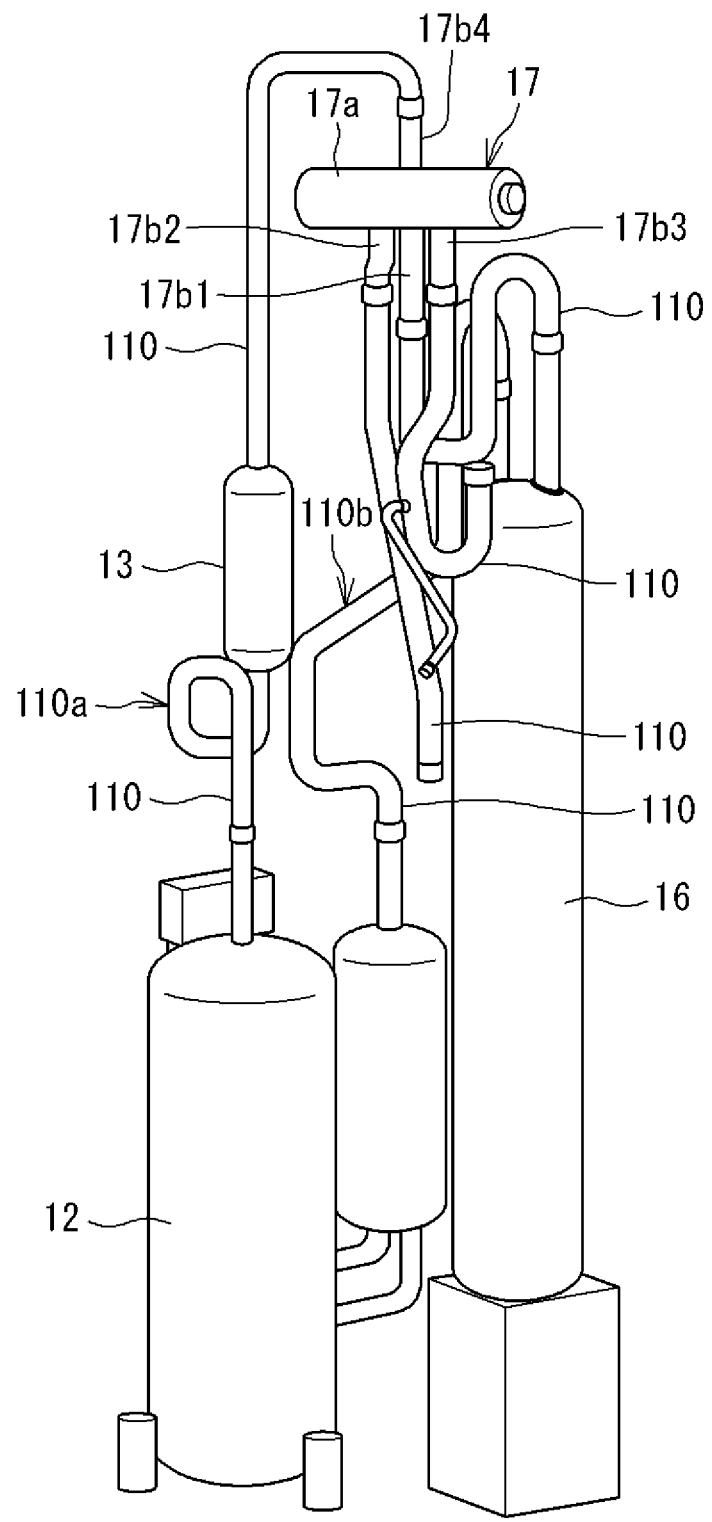
FIG. 19 is a perspective view illustrating a state in which a valve unit is connected to an element component according to a comparative example.

FIG. 19 is a perspective view illustrating a state in which a valve unit according to a comparative example is connected to the element component. In the valve unit illustrated in FIG. 19, the valve main body 17a and the ports 17b1 to 17b4 of the four-way switching valve 17, and a refrigerant pipe 110 include copper. In this comparative example, vibration of the compressor 12 is transmitted to the refrigerant pipe 110, but the refrigerant pipe 110 including copper has a low strength. Thus, a structure for absorbing the vibration is required. For example, the refrigerant pipe 110 has to be partially bent to form a loop 110a or a bypass 110b. Therefore, the structure of the refrigerant pipe 110 becomes complicated, and a large space is required for providing the refrigerant pipe 110.

In one or more embodiments, as shown in FIG. 18, parts responsible for strength (first and second pipe bodies 21a and 22a) of the first to third, fifth, and sixth refrigerant pipes 10A1 to 10A3, 10A5, and 10A6 all include stainless steel, and the fourth refrigerant pipe 10B also includes stainless steel. Since the refrigerant pipes 10A1 to 10A3, 10A5, 10A6, and 10B have higher strength than the copper refrigerant pipe 110 illustrated in FIG. 19, it is not necessary to provide a special structure that absorbs vibration of the compressor 12. Therefore, the fifth and sixth refrigerant pipes 10A5 and 10A6 connected to the compressor 12 can be formed in a simple structure without being largely bent and can be disposed in a small space.

When the refrigerant pipes 10A1 to 10A3, 10A5, 10A6, and 10B include a part in which copper is present alone in the pipe axial direction, stress concentrates on the part, which causes breakage. However, since the refrigerant pipes 10A1 to 10A3, 10A5, 10A6, and 10B according to one or more embodiments do not include a part in which copper is present alone in the pipe axial direction, breakage due to stress concentration can also be suppressed.

The compressor 12 and the accumulator 16 described above are normally fixed to a bottom plate of a casing of the outdoor unit 2, but the four-way switching valve 17 is disposed at a position spaced upward from the bottom plate and is not directly fixed to the casing or the like of the outdoor unit 2. Therefore, during transportation of the refrigeration apparatus 1 or the like, the four-way switching valve 17 easily vibrates, and a load associated with the vibration is applied to the first to fourth refrigerant pipes 10A1 to 10A3 and 10B connected to the four-way switching valve 17. However, since the parts of the first to third refrigerant pipes 10A1 to 10A3 mainly responsible for strength (first and second pipe bodies 21a and 22a) all include stainless steel, and the fourth refrigerant pipe 10B also includes stainless steel, deformation and damage can be suppressed.

Figure 4:
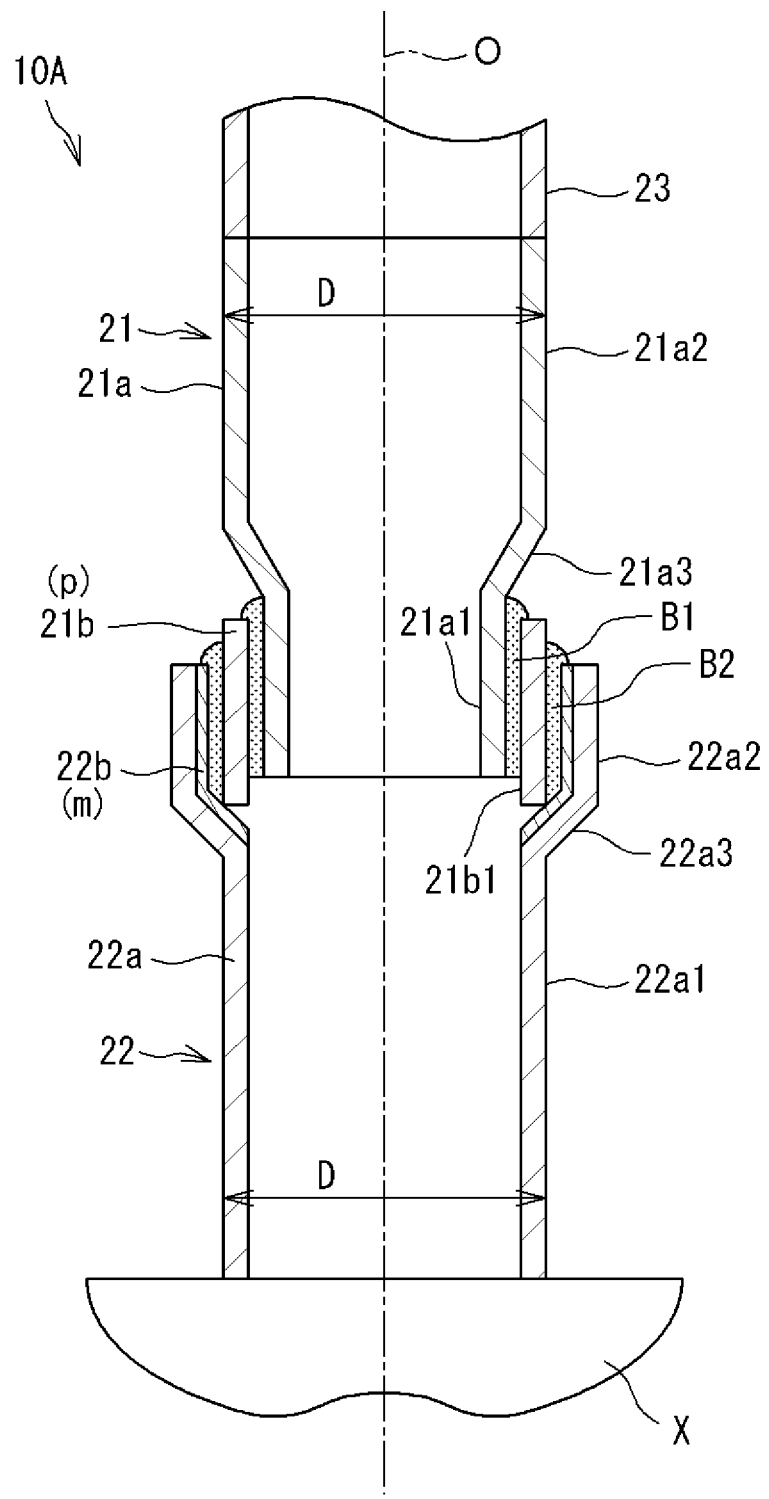
FIG. 4 is a sectional view illustrating a connected portion between a first pipe and a second pipe of a refrigerant pipe according to one or more embodiments.

FIG. 4 is a sectional view illustrating a connected portion between a first pipe and a second pipe of a refrigerant pipe according to one or more embodiments.

The refrigerant pipe 10A according to one or more embodiments includes a third pipe 23 in addition to the first pipe 21 and the second pipe 22. The third pipe 23 has the same axis O as the first pipe 21 and the second pipe 22.

The first pipe 21 according to one or more embodiments is shorter in the pipe axial direction than the first pipe 21 according to the embodiments described above. The first pipe 21 is disposed between the second pipe 22 and the third pipe 23 in the pipe axial direction. Therefore, the first pipe 21 according to one or more embodiments has a function as a joint that connects the second pipe 22 and the third pipe 23 to each other.

The third pipe 23 is connected to the first large diameter portion 21a2 of the first pipe body 21a of the first pipe 21. The third pipe 23 includes stainless steel which is the same material as the material of the first pipe body 21a. The first pipe body 21a and the third pipe 23 are connected to each other by welding such as TIG welding. Alternatively, the first pipe body 21a and the third pipe 23 may be connected to each other by brazing. The third pipe 23 has the same outer diameter D as the first large diameter portion 21a2 of the first pipe body 21a.

In the first pipe 21 in the refrigerant pipe 10A according to one or more embodiments, since the first large diameter portion 21a2 of the first pipe body 21a is longer in the pipe axial direction, the first pipe 21 is increased in size and is complicated to handle during in-furnace brazing between the first pipe body 21a and the first connection pipe 21b. In the first pipe 21 according to one or more embodiments, the first pipe body 21a is shorter, and the first pipe 21 itself is used as a "joint" connecting the second pipe 22 and the third pipe 23 to each other. Thus, the first pipe 21 is downsized, and in-furnace brazing can be easily performed. In addition, by downsizing the first pipe 21, the number of first pipes 21 that can be introduced into the furnace at a time can be increased, and thus production efficiency can be improved.

Figure 5:
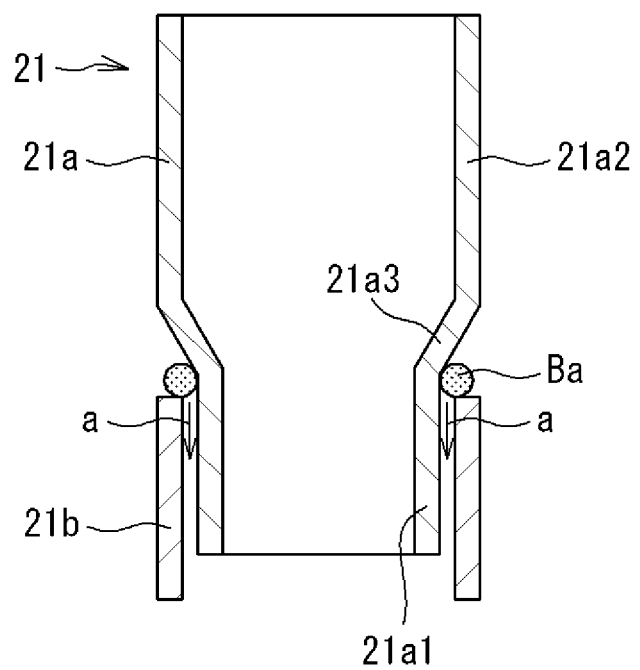
FIG. 5 is a sectional view illustrating a state before brazing of a first pipe body and a first connection pipe of the first pipe.

FIG. 5 is a sectional view illustrating a state before brazing of the first pipe body and the first connection pipe of the first pipe.

In one or more embodiments, in order to braze the first pipe body 21a and the first connection pipe 21b, first, a ring brazing filler metal Ba to be the first brazing material B1 is fitted to outside of the first small diameter portion 21a1 of the first pipe body 21a in the pipe radial direction. Next, the first connection pipe 21b is fitted to the outside of the first small diameter portion 21a1 in the pipe radial direction, and the ring brazing filler metal Ba is sandwiched between the first connection pipe 21b and the first step portion 21a3. With the first pipe body 21a above and the first connection pipe 21b below, the first pipe body 21a and the first connection pipe 21b are put into a high-temperature furnace to melt the ring brazing filler metal Ba, and as indicated by an arrow a, the first brazing material B1 is poured into a gap between the outer peripheral surface of the first small diameter portion 21a1 and the inner peripheral surface of the first connection pipe 21b.

In this manner, by sandwiching the ring brazing filler metal Ba between the first connection pipe 21b and the first step portion 21a3, brazing can be performed in a state where the first connection pipe 21b, the first pipe body 21a, and the ring brazing filler metal Ba are relatively positioned. In addition, when the first pipe 21 is longer as in the embodiments described above, the first pipe 21 can be put into the furnace only in a lateral orientation, but when the first pipe 21 is downsized as in one or more embodiments, brazing can be performed in a state where the axis of the first pipe 21 (the first pipe body 21a and the first connection pipe 21b) is oriented in the up-down direction as described above. Thus, the first brazing material B1 can be uniformly poured into the gap between the outer peripheral surface of the first small diameter portion 21a1 and the inner peripheral surface of the first connection pipe 21b.

Modification of First Pipe Body 21a

FIGS. 6A, 6B, and 6C are sectional views illustrating a modification of the first pipe body.

In the modification illustrated in FIGS. 6A to 6C, an end 23a of the third pipe 23 is inserted inside the first large diameter portion 21a2 formed in the first pipe body 21a of the first pipe 21, and the first large diameter portion 21a2 and the third pipe 23 are connected to each other by welding.

In an example illustrated in FIG. 6A, the first pipe body 21a of the first pipe 21 and the third pipe 23 are circumferentially welded at one area in the pipe axial direction, indicated by Y1. This welding area Y1 is located at a tip of the first large diameter portion 21a2. The welding is performed on an outer periphery of the first large diameter portion 21a2 at the welding area Y1, and then, the first large diameter portion 21a2 and the third pipe 23 are melted and connected to each other.

The welding area Y1 is located at an end of the first pipe 21 opposite to the second pipe 22 in a range where the first pipe body 21a of the first pipe and the third pipe 23 overlap each other in the pipe radial direction. In other words, the welding area Y1 is located closer to atmosphere (outside of the refrigerant pipe 10A) in the range where the first pipe body 21a of the first pipe 21 and the third pipe 23 overlap each other in the pipe radial direction. Therefore, the welding can be easily performed while a connection state between the first pipe body 21a of the first pipe 21 and the third pipe 23 are confirmed. Furthermore, as compared with a case where a butted portion between the first pipe body 21a and the third pipe 23 is welded as in one or more embodiments illustrated in FIG. 4, in the present modification, a region of welding can be widened, a strength of a connected portion between the first pipe body 21a and the third pipe 23 can be increased, and a structure withstanding large stress can be obtained.

In an example illustrated in FIG. 6B, the first pipe body 21a of the first pipe 21 and the third pipe 23 are circumferentially welded at two areas in the pipe axial direction, indicated by Y1 and Y2. These welding areas Y1 and Y2 are located at both ends of the first large diameter portion 21a2 in the pipe axial direction.

As illustrated in FIG. 6A, when the first large diameter portion 21a2 and the third pipe 23 are connected to each other only at the welding area Y1, if a minute movement occurs at the end 23a of the third pipe 23 due to a flow of the refrigerant in the refrigerant pipe 10A or the like, stress may concentrate near a boundary between the first large diameter portion 21a2 and the first step portion 21a3. Therefore, in the example shown in FIG. 6B, by connecting the first large diameter portion 21a2 and the third pipe 23 to each other also at the welding area Y2, the movement of the third pipe 23 can be restricted, and stress concentration generated in the first pipe body 21a of the first pipe 21 can be suppressed.

In an example illustrated in FIG. 6C, as in the example illustrated in FIG. 6A, the end 23a of the third pipe 23 is inserted inside the first large diameter portion 21a2 formed in the first pipe body 21a of the first pipe 21, and the first large diameter portion 21a2 and the third pipe 23 are connected to each other by welding. The first large diameter portion 21a2 according to the present modification is shorter in the pipe axial direction than the first large diameter portion 21a2 illustrated in FIG. 6A, and the first pipe body 21a of the first pipe 21 and the third pipe 23 are welded to each other circumferentially at one area Y3 in the pipe axial direction. In the present modification, since the first large diameter portion 21a2 is shorter, an entire range of the first large diameter portion 21a2 in the pipe axial direction can be connected to the third pipe 23 by welding at one location Y3.

In each example shown in FIGS. 6A to 6C, by forming the first small diameter portion 21a1 of the first pipe body 21a shorter in the pipe axial direction or forming the first connection pipe 21b longer in the pipe axial direction, the end of the first connection pipe 21b may abut on the first step portion 21a3 to position the first connection pipe 21b in the pipe axial direction with respect to the first pipe body 21a.

FIGS. 7A to 9 are sectional views illustrating further modifications of the first pipe body.

Figure 7A:
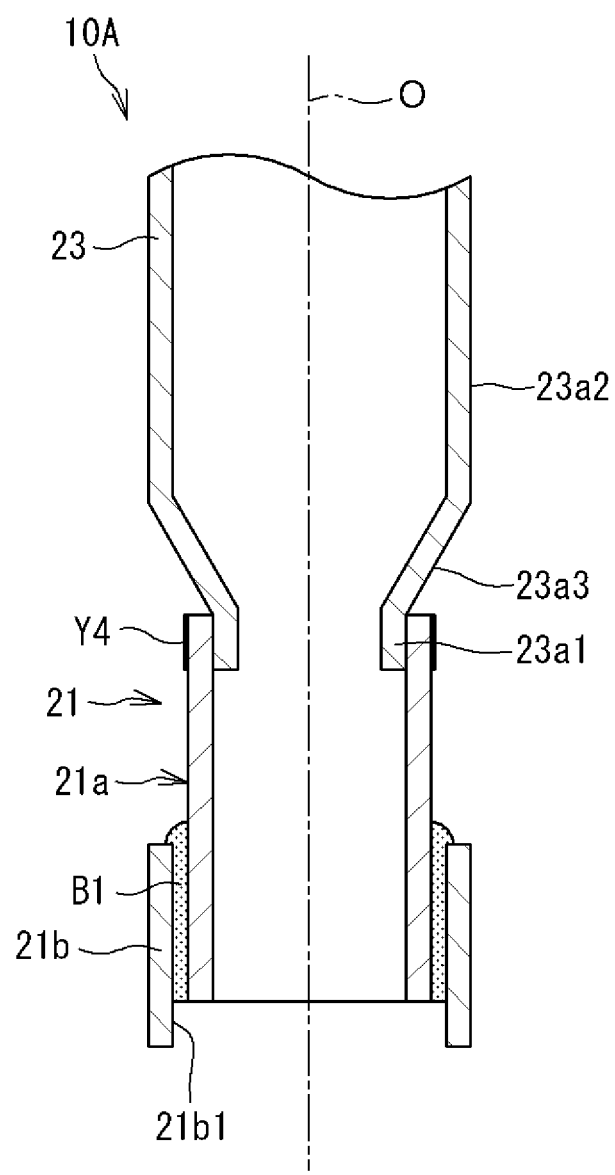
FIGS. 7A and 7B are sectional views illustrating a further modification of the first pipe body.

In an example illustrated in FIG. 7A, the first pipe body 21a of the first pipe 21 is constituted by a straight pipe having a constant outer diameter. On the other hand, the third pipe 23 includes a third small diameter portion 23a1, a third large diameter portion 23a2, and a third step portion 23a3. The third small diameter portion 23a1 is disposed at the end of the third pipe 23 and is inserted into the first pipe body 21a. The first pipe body 21a and the third pipe 23 are circumferentially welded at one area Y4 in the pipe axial direction. This welding is performed over an entire range of the third small diameter portion 23a1 in the pipe axial direction.

Figure 7B:
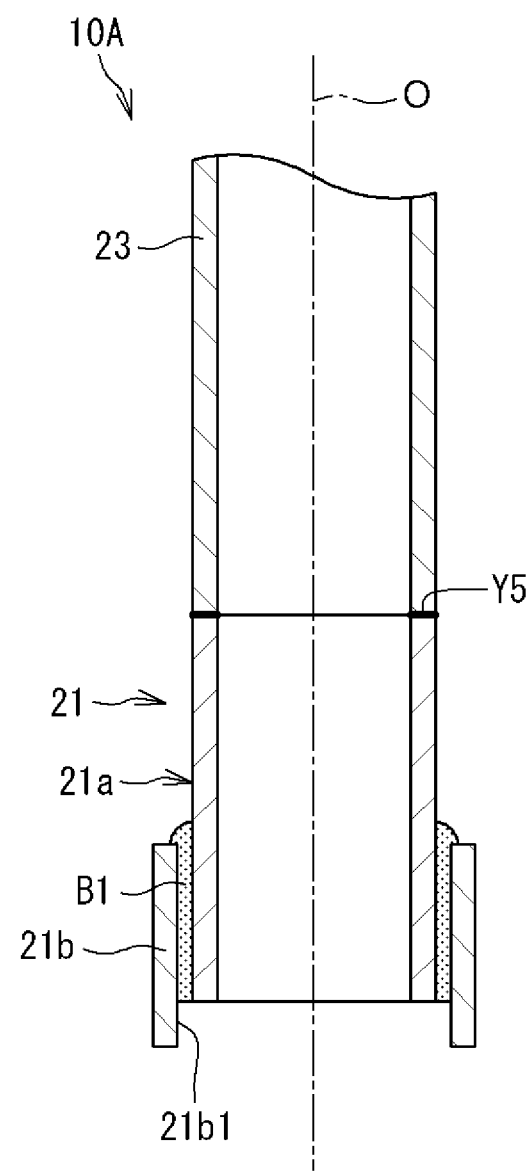

In an example illustrated in FIG. 7B, the first pipe body 21a of the first pipe 21 is constituted by a straight pipe having a constant outer diameter. The third pipe 23 is also constituted by a straight pipe having at least an end whose outer diameter is the same as the first pipe body 21a. The first pipe body 21a and the third pipe 23 are welded on a butted surface Y5.

In the modification illustrated in FIGS. 8A and 8B, a fourth large diameter portion 21a4 having a diameter larger than the diameter of the first large diameter portion 21a2 and a fourth step portion 21a5 disposed between the first large diameter portion 21a2 and the fourth large diameter portion 21a4 are formed in the first pipe body 21a of the first pipe 21. The end of the third pipe 23 is inserted into the fourth large diameter portion 21a4, and the fourth large diameter portion 21a4 and the third pipe 23 are connected to each other by welding.

In an example illustrated in FIG. 8A, the fourth large diameter portion 21a4 of the first pipe 21 and the third pipe 23 are circumferentially welded at one area, indicated by Y1 in the pipe axial direction. The welding area Y1 is located at a tip of the fourth large diameter portion 21a4. The welding is performed on an outer periphery of the fourth large diameter portion 21a4 at the welding area Y1, and then, the fourth large diameter portion 21a4 and the third pipe 23 are melted and connected to each other.

The welding area Y1 is located at an end of the first pipe 21 opposite to the second pipe 22 in a range where the first pipe body 21a of the first pipe and the third pipe 23 overlap each other in the pipe radial direction. In other words, the welding area Y1 is located closer to atmosphere (outside of the refrigerant pipe 10A) in the range where the first pipe body 21a of the first pipe 21 and the third pipe 23 overlap each other in the pipe radial direction. Therefore, the welding can be easily performed while a connection state between the first pipe 21 and the third pipe 23 are confirmed. Furthermore, as compared with a case where a butted portion between the first pipe body 21a and the third pipe is welded as in one or more embodiments illustrated in FIG. 4, in the present modification, a region of welding can be widened, a strength of a connected portion between the first pipe body 21a and the third pipe can be increased, and a structure withstanding large stress can be obtained.

In an example illustrated in FIG. 8B, the first pipe body 21a of the first pipe 21 and the third pipe 23 are circumferentially welded at two areas in the pipe axial direction, indicated by Y1 and Y2. These welding areas Y1 and Y2 are located at both ends of the fourth large diameter portion 21a4 in the pipe axial direction.

As illustrated in FIG. 8A, when the fourth large diameter portion 21a4 and the third pipe 23 are connected to each other only at the welding area Y1, if a minute movement occurs at the end 23a of the third pipe 23 due to a flow of the refrigerant in the refrigerant pipe 10A or the like, stress may concentrate near a boundary between the fourth large diameter portion 21a4 and the fourth step portion 21a5. Therefore, in the example shown in FIG. 8B, by connecting the fourth large diameter portion 21a4 and the third pipe 23 to each other also at the welding area Y2, the movement of the third pipe 23 can be restricted, and stress concentration generated in the first pipe 21 can be suppressed.

Figure 9:
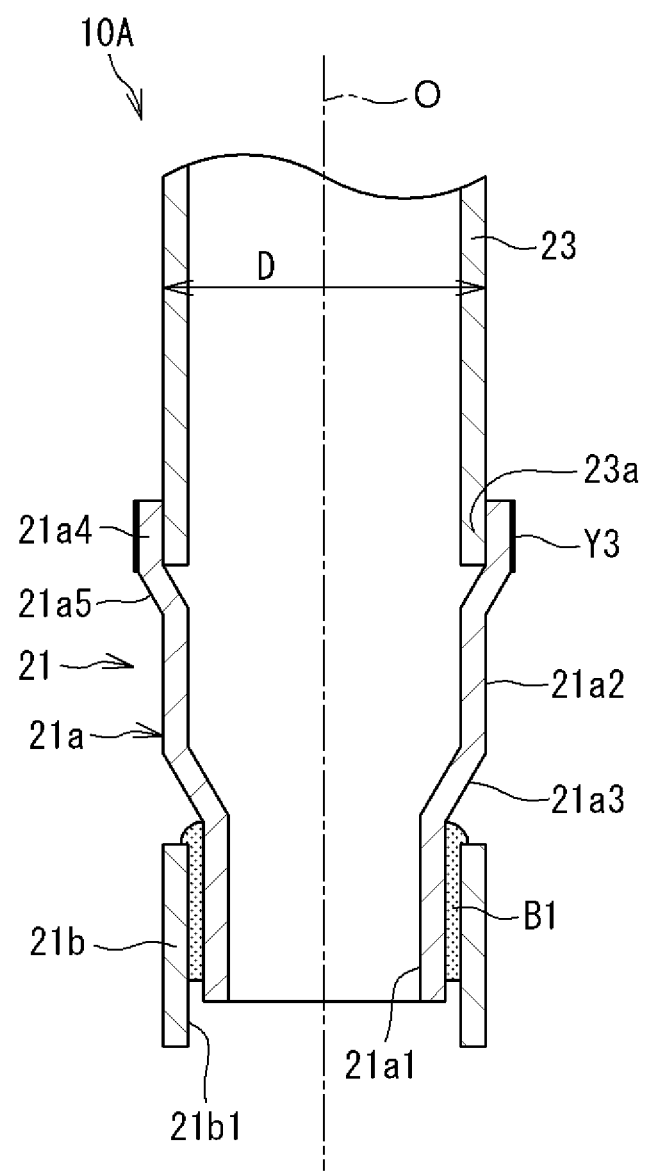
FIG. 9 is a sectional view illustrating a further modification of the first pipe body.

In an example illustrated in FIG. 9, similarly to the example illustrated in FIGS. 8A and 8B, the fourth large diameter portion 21a4 and the fourth step portion 21a5 are formed in the first pipe body 21a of the first pipe 21. The third pipe 23 is inserted into the fourth large diameter portion 21a4, and the fourth large diameter portion 21a4 and the third pipe 23 are connected to each other by welding. The fourth large diameter portion 21a4 according to the present modification is shorter in the pipe axial direction than the fourth large diameter portion 21a4 illustrated in FIGS. 8A and 8B, and the first pipe 21 and the third pipe 23 are welded to each other circumferentially at one area Y3 in the pipe axial direction. In the present modification, since the fourth large diameter portion 21a4 is shorter, an entire range of the fourth large diameter portion 21a4 in the pipe axial direction can be connected to the third pipe 23 by welding at one location Y3.

Figure 10:
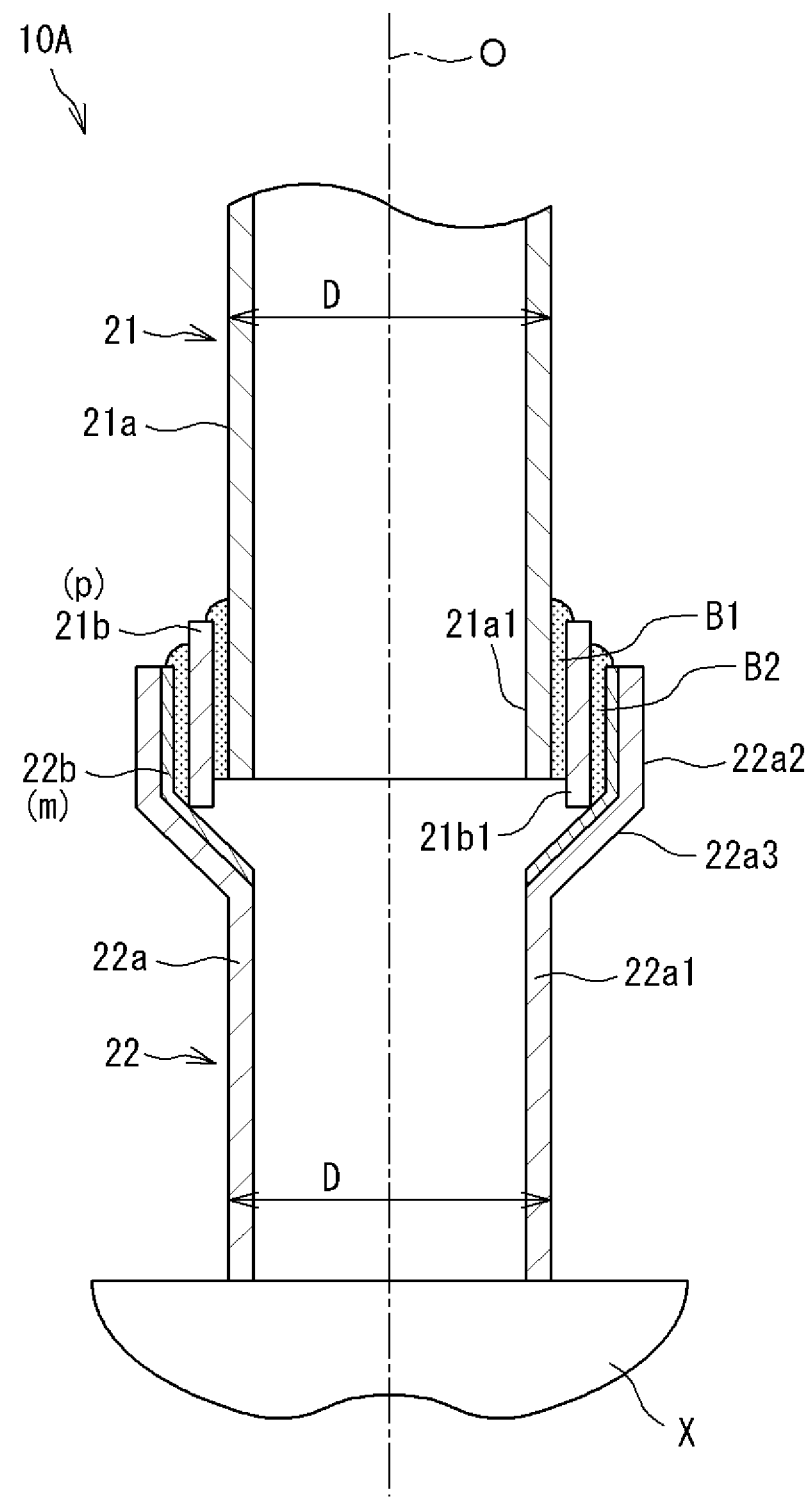
FIG. 10 is a sectional view illustrating a connected portion between a first pipe and a second pipe of a refrigerant pipe according to one or more embodiments.

FIG. 10 is a sectional view illustrating a connected portion between a first pipe and a second pipe of a refrigerant pipe according to one or more embodiments.

In the refrigerant pipe 10A according to one or more embodiments, a structure of the first pipe 21 is different from the embodiments described above. The first pipe body 21a of the first pipe 21 has a constant inner diameter and outer diameter D, and does not include the first large diameter portion, the first small diameter portion, and the first step portion as in the embodiments described above.

One or more embodiments produce functional effects substantially similar to those of the embodiments described above. Since the first small diameter portion 21a1 is unnecessary in the first pipe 21, there is an advantage that processing is facilitated. On the other hand, in one or more embodiments, since the outer diameter of the second large diameter portion 22a2 of the second pipe body 22a in the second pipe 22 needs to be larger than the diameter of the second large diameter portion 22a2 according to the embodiments described above, it is difficult to process the second pipe body 22a.

Figure 11:
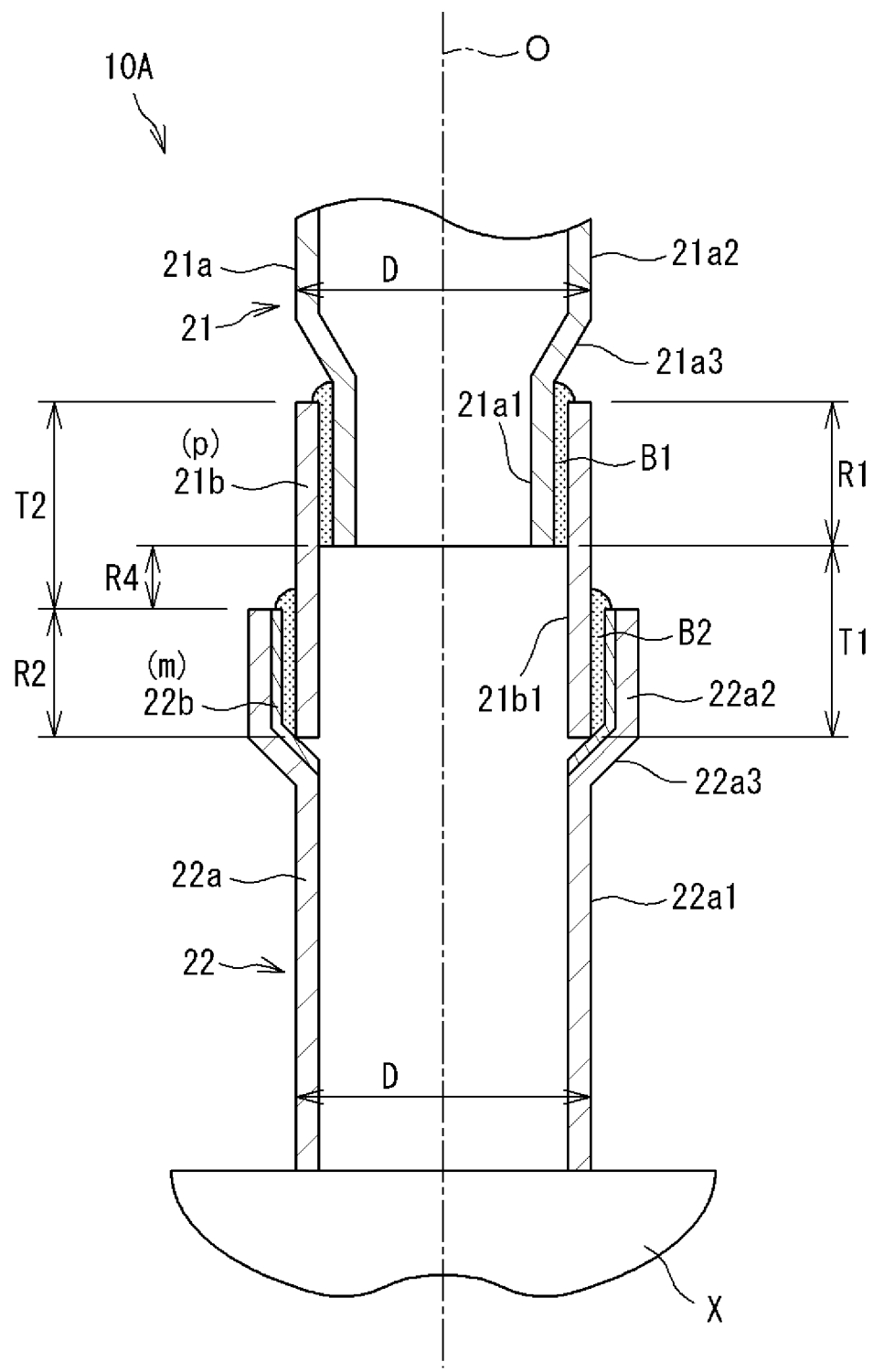
FIG. 11 is a sectional view illustrating a connected portion between a first pipe and a second pipe of a refrigerant pipe according to one or more embodiments.

FIG. 11 is a sectional view illustrating a connected portion between a first pipe and a second pipe of a refrigerant pipe according to one or more embodiments.

In the refrigerant pipe 10A according to one or more embodiments, a structure of the first pipe 21 is different from the embodiments described above. In the first connection pipe 21b of the first pipe 21, the protrusion amount T1 of the protrusion 21b1 protruding from the first pipe body 21a in the pipe axial direction is larger than the overlap amount R1 with the first pipe body 21a. The protrusion amount T1 of the protrusion 21b1 is larger than the overlap amount R2 of the first connection pipe 21b and the second pipe 22 in the pipe axial direction. Therefore, the refrigerant pipe 10A according to one or more embodiments has a region R4 in which the first connection pipe 21b alone exists midway in the pipe axial direction.

One or more embodiments produce functional effects substantially similar to those of the embodiments described above. However, the refrigerant pipe 10A according to one or more embodiments has the region R4 in which the first connection pipe 21b having a possibility of strength reduction due to in-furnace brazing exists alone.

Figure 12:
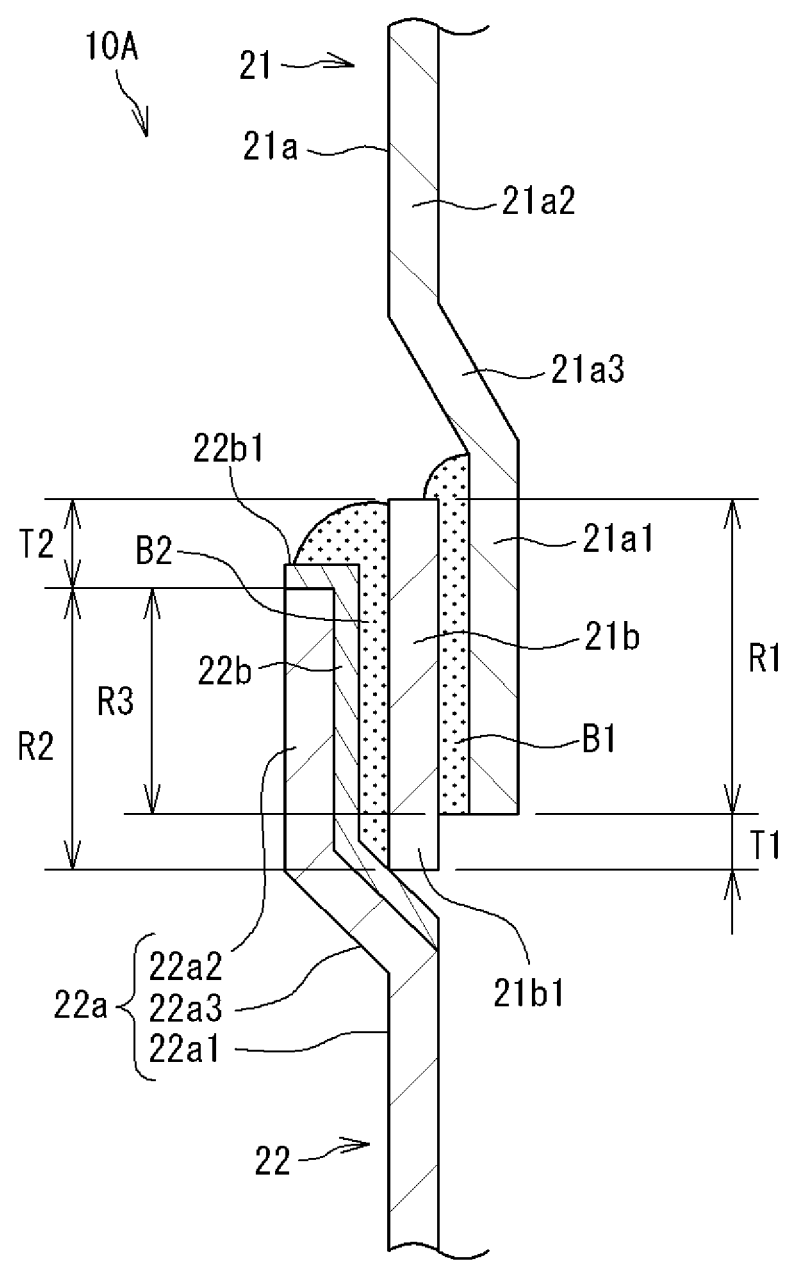
FIG. 12 is an enlarged sectional view illustrating a connected portion between a first pipe and a second pipe of a refrigerant pipe according to one or more embodiments.

FIG. 12 is an enlarged sectional view illustrating a connected portion between a first pipe and a second pipe of a refrigerant pipe according to one or more embodiments.

In the refrigerant pipe 10A according to one or more embodiments, a structure of the second connection 22b of the second pipe 22 is different from the embodiments described above. The second connection 22b includes a plating layer provided on the inner peripheral surface and a tip surface (an upper end surface in FIG. 12) of the second large diameter portion 22a2 of the second pipe body 22a and the inner peripheral surface of the second step portion 22a3. That is, one or more embodiments are different from the embodiments described above in that the second connection 22b has a portion 22b1 that covers the tip surface of the second large diameter portion 22a2.

In the embodiments described above, since the second connection 22b is not provided on the tip surface of the second large diameter portion 22a2, the second brazing material B2 is repelled when brazing is performed to the tip surface of the second large diameter portion 22a2, and it is difficult to increase an area to be brazed. In one or more embodiments, since the portion 22b1 of the second connection 22b is provided on the tip surface of the second large diameter portion 22a2, the area to be brazed can be expanded to a position covering the portion 22b1, and the connection between the second pipe 22 and the first pipe 21 can be further strengthened.

Note that the structure of the second connection 22b in FIG. 12 can also be applied to the embodiments described above.

Figure 13:
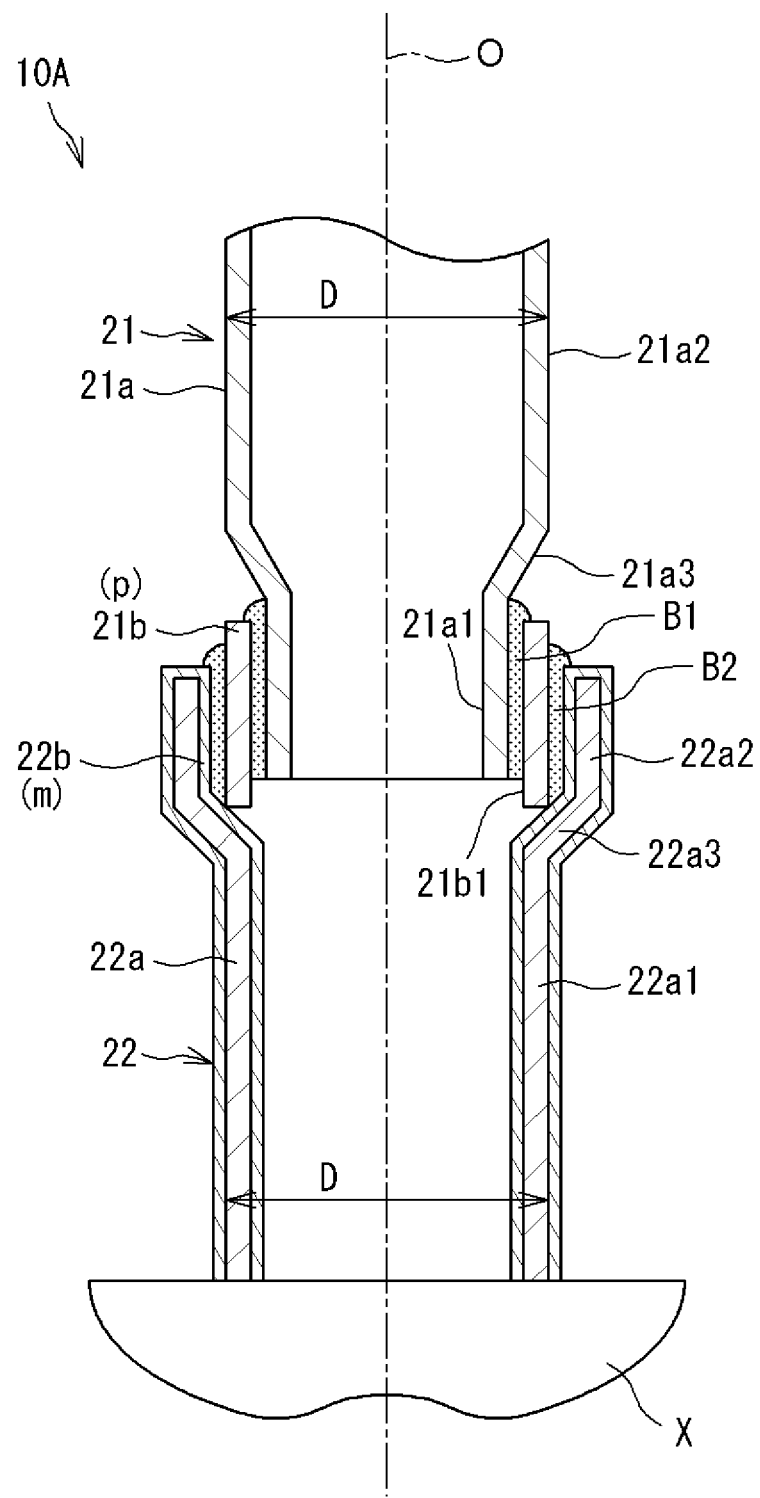
FIG. 13 is a sectional view illustrating a connected portion between a first pipe and a second pipe of a refrigerant pipe according to one or more embodiments.

FIG. 13 is a sectional view illustrating a connected portion between a first pipe and a second pipe of a refrigerant pipe according to one or more embodiments.

In the refrigerant pipe 10A according to one or more embodiments, a configuration of the second pipe 22 is different from the embodiments described above. As in the embodiments described above, the second pipe 22 includes the second pipe body 22a and the second connection 22b. However, the second connection 22b includes a plating layer provided not only at one end of the second pipe body 22a but also all over an outer surface of the second pipe body 22a.

In one or more embodiments, when the second connection 22b including a plating layer is provided in the second pipe body 22a, the second pipe body 22a as a whole only has to be immersed in a plating bath, and thus the plating is easily performed. The other configurations are similar to those in the embodiments described above.

The second connection 22b may be configured by providing a plating layer on the inner peripheral surfaces and the outer peripheral surfaces of the second large diameter portion 22a2 and the second step portion 22a3 of the second pipe body 22a.

Figure 14:
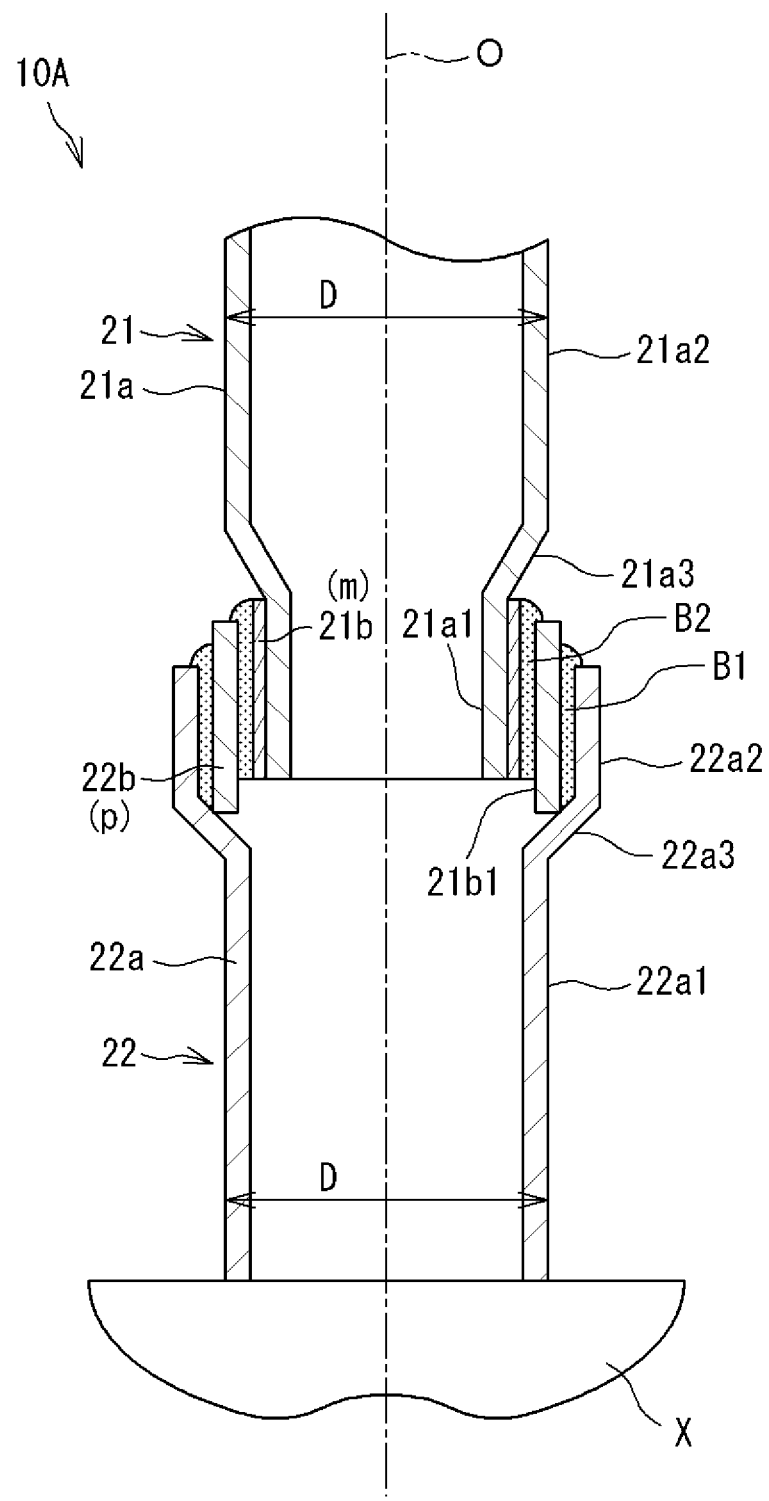
FIG. 14 is a sectional view illustrating a connected portion between a first pipe and a second pipe of a refrigerant pipe according to one or more embodiments.

FIG. 14 is a sectional view illustrating a connected portion between a first pipe and a second pipe of a refrigerant pipe according to one or more embodiments.

In the refrigerant pipe 10A according to one or more embodiments, the first connection 21b of the first pipe 21 is a plating layer provided at an end of the first pipe body 21a. The second connection 22b of the second pipe 22 is a pipe (second connection pipe 22b) attached to an end of the second pipe body 22a. The first pipe body 21a and the second pipe body 22a both include stainless steel. The first connection 21b and the second connection pipe 22b both include copper.

In one or more embodiments, the second pipe body 22a including stainless steel and the second connection pipe 22b including copper are connected to each other with the first brazing material B1 by in-furnace brazing. The second connection pipe 22b including copper and the first connection 21b including copper are connected to each other with the second brazing material B2 by hand brazing. The melting point of the first brazing material B1 is higher than the melting point of the second brazing material B2.

In one or more embodiments, in order to disconnect the connection between the first pipe 21 and the second pipe 22, the connected portion between the pipes is heated at a temperature lower than the melting point of the first brazing material B1 and higher than the melting point of the second brazing material B2, and the second brazing material B2 is melted without melting the first brazing material B1. Thus, the connected portion between the first pipe 21 and the second pipe 22 can be disconnected. In the second pipe 22, since the second connection pipe 22b remains connected to the second pipe body 22a, a new first pipe 21 can be connected using the second connection pipe 22b.

Figure 15:
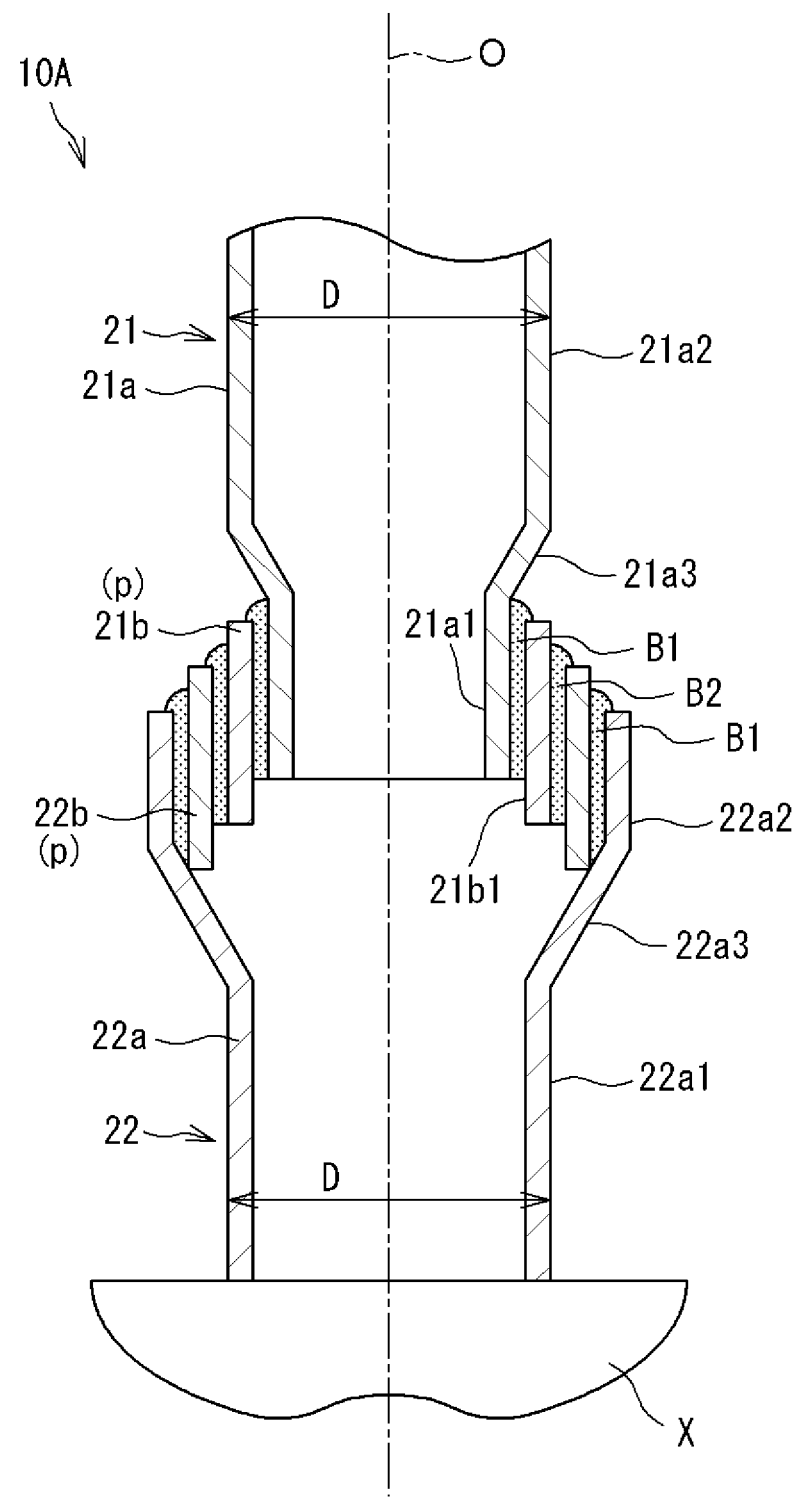
FIG. 15 is a sectional view illustrating a connected portion between a first pipe and a second pipe of a refrigerant pipe according to one or more embodiments.

FIG. 15 is a sectional view illustrating a connected portion between a first pipe and a second pipe of a refrigerant pipe according to one or more embodiments.

In the refrigerant pipe 10A according to one or more embodiments, both the first connection 21b of the first pipe 21 and the second connection 22b of the second pipe 22 are pipes (first connection pipe 21b and second connection pipe 22b). The first pipe body 21a and the second pipe body 22a both include stainless steel. The first connection pipe 21b and the second connection pipe 22b both include copper.

In one or more embodiments, the first pipe body 21a including stainless steel and the first connection pipe 21b including copper are connected to each other with the first brazing material B1 by in-furnace brazing. The second pipe body 22a including stainless steel and the second connection pipe 22b including copper are also connected to each other with the first brazing material B1 by in-furnace brazing.

The first connection pipe 21b including copper and the second connection pipe 22b including copper are connected to each other with the second brazing material B2 by hand brazing. The melting point of the first brazing material B1 is higher than the melting point of the second brazing material B2.

In one or more embodiments, in order to disconnect the connection between the first pipe 21 and the second pipe 22, the connected portion between the pipes is heated at a temperature lower than the melting point of the first brazing material B1 and higher than the melting point of the second brazing material B2, and the second brazing material B2 is melted without melting the first brazing material B1. Thus, the connected portion between the first pipe 21 and the second pipe 22 can be disconnected. In the first pipe 21, the first connection pipe 21b remains connected to the first pipe body 21a, and in the second pipe 22, the second connection pipe 22b remains connected to the second pipe body 22a. Therefore, a new second pipe 22 or a new first pipe 21 can be connected using the first connection pipe 21b and the second connection pipe 22b, respectively.

Figure 16:
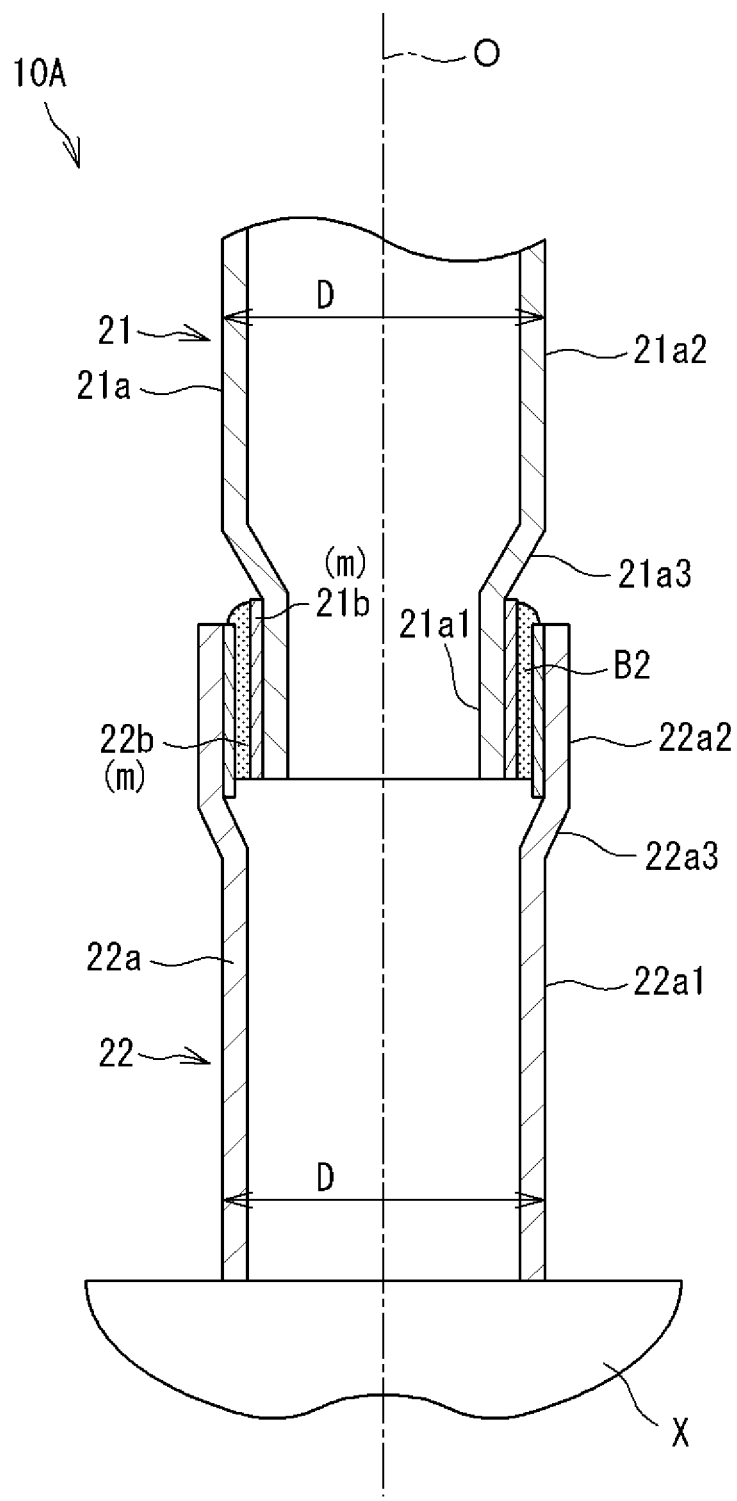
FIG. 16 is a sectional view illustrating a connected portion between a first pipe and a second pipe of a refrigerant pipe according to one or more embodiments.

FIG. 16 is a sectional view illustrating a connected portion between a first pipe and a second pipe of a refrigerant pipe according to one or more embodiments.

In the refrigerant pipe 10A according to one or more embodiments, the first connection 21b of the first pipe 21 is a plating layer provided at an end of the first pipe body 21a. The second connection 22b of the second pipe 22 is a plating layer provided at an end of the second pipe body 22a.

The first pipe 21 and the second pipe 22 are connected to each other by hand-brazing the first connection 21b and the second connection 22b to each other.

In one or more embodiments, the first and second connections 21b and 22b can be easily provided in the first and second pipe bodies 21a and 22a, respectively.

In one or more embodiments, the first connection 21b of the first pipe 21 and the second connection 22b of the second pipe 22 include copper. However, these pipes need not include copper, but the material can be appropriately changed. For example, the first connection 21b and the second connection 22b can include a copper alloy. A copper alloy is an alloy in which other metals or non-metals are added to copper as a main component to improve properties of copper. Like copper, a copper alloy is a member that does not require a flux treatment or the like and is easily brazed. As the copper alloy, for example, a copper alloy containing copper in an amount of 98 wt % or more is employed. As the copper alloy, a copper alloy containing copper in an amount of 99 wt % or more may be employed.

The first connection 21b of the first pipe 21 and the second connection 22b of the second pipe 22 only have to include materials having the same main component. Thus, one of the first connection pipe 21b or the second connection 22b may include copper and the other may include a copper alloy, in addition to a case where both include copper or a case where both include a copper alloy. When both the first connection pipe 21b and the second connection 22b include a copper alloy, components other than the main component may be different from each other. That is, the first connection pipe 21b and the second connection 22b may include different materials having the same main component. In this case, both can be brazed without using flux.

The first connection 21b and the second connection 22b can include aluminum or an aluminum alloy. In the present specification, "aluminum" is "pure aluminum" containing 99.9 wt % or more of aluminum as a main component. The aluminum alloy is an alloy in which other metals or nonmetals are added to aluminum as a main component to improve properties of aluminum. As the aluminum alloy, for example, an aluminum alloy containing 95 wt % or more of aluminum is employed. Both the first connection pipe 21b and the second connection pipe 22b may include aluminum, both of the connection pipes may include an aluminum alloy, or one of the connection pipes may include aluminum and the other connection pipe include an aluminum alloy. When both the first connection pipe 21b and the second connection 22b include an aluminum alloy, components other than the main component may be different.

Although the second pipe 22 according to one or more embodiments is provided in the element component X and constitutes a part of the element component X, the second pipe 22 may simply constitute only the refrigerant pipe 10A. The first pipe 21 may constitute a part of the element component X.

The coupling pipe 31 is provided in the first pipe body 21a of the first pipe 21, but may be provided in the second pipe body 22a of the second pipe 22. The coupling pipe 31 of one or more embodiments includes copper, but may include a copper alloy. Similarly, another refrigerant pipe 32 connected to the coupling pipe 31 may include a copper alloy. One of the coupling pipe 31 or the refrigerant pipe 32 may include copper, and the other may include a copper alloy. When both the coupling pipe 31 and the refrigerant pipe 32 include a copper alloy, components other than the main component may be different from each other.

The third pipe 23 according to one or more embodiments may be connected to the second pipe body 22a of the second pipe 22. In this case, the second pipe 22 functions as a joint that connects the first pipe 21 and the third pipe 23 to each other.

Operation and Effects of Embodiments

In the refrigeration apparatus, when stainless steel is used as the material of the refrigerant pipe, an operation of manually brazing the refrigerant pipes including stainless steel to each other may occur during manufacturing the refrigeration apparatus or during maintenance such as part replacement. However, brazing of a stainless steel refrigerant pipe requires work such as removal of an oxide film on a surface, and thus the work becomes complicated. Therefore, one or more embodiments of the present disclosure facilitate connection between stainless steel refrigerant pipes.

Operation and Effects (1) The refrigerant pipe 10A according to one or more embodiments includes the first pipe 21 and the second pipe 22. The first pipe 21 includes the first pipe body 21a including stainless steel and the first connection 21b provided at an end of the first pipe body 21a in the pipe axial direction and including a material different from stainless steel. The second pipe 22 includes the second pipe body 22a including stainless steel, and the second connection 22b provided at an end of the second pipe body 22a in the pipe axial direction and including the same material as the first connection 21b. The first connection 21b and the second connection 22b are connected to each other.

In the refrigerant pipe 10A having the above configuration, since the first pipe 21 and the second pipe 22 have the first connection 21b and the second connection 22b, respectively, which include the same material different from stainless steel, brazing of stainless steel is unnecessary by connecting the first connection 21b and the second connection 22b to each other by brazing or the like, and the first pipe 21 and the second pipe 22 can be easily connected.

(2) The refrigerant pipe 10A according to one or more embodiments includes the first pipe 21 and the second pipe 22. The first pipe 21 includes the first pipe body 21a including stainless steel and the first connection 21b provided at an end of the first pipe body 21a in the pipe axial direction and including a material different from stainless steel. The second pipe 22 includes the second pipe body 22a including stainless steel, and the second connection 22b provided at an end of the second pipe body 22a in the pipe axial direction and including a material whose main component is the same as a main component of the material of the first connection 21b. The first connection 21b and the second connection 22b are connected to each other.

In the refrigerant pipe 10A having the above configuration, since the first pipe 21 and the second pipe 22 have the first connection 21b and the second connection 22b, respectively, which include a material being different from stainless steel and having the same main component, brazing of stainless steel is unnecessary by connecting the first connection 21b and the second connection 22b to each other by brazing or the like, and the first pipe 21 and the second pipe 22 can be easily connected.

(3) In the refrigerant pipe 10A according to one or more embodiments, the first connection 21b and the second connection 22b include different materials having the same main component.

In this case, the first pipe and the second pipe can be still connected to each other easily.

(4) In one or more embodiments, the first connection 21b and the second connection 22b include any of copper, a copper alloy, aluminum, or an aluminum alloy. Therefore, the first pipe 21 and the second pipe 22 can be easily connected by brazing using an inexpensive brazing material.

(5) In one or more embodiments, an end of the first pipe body 21a and an end of the second pipe body 22a are disposed to overlap each other in the pipe radial direction. Therefore, in the refrigerant pipe 10A, the first and second connections 21b and 22b that may be reduced in strength due to in-furnace brazing do not exist alone, and the first pipe body 21a and the second pipe body 22a can compensate for the strength reduction of the first and second connections 21b and 22b.

(6) In one or more embodiments, the first connection 21b is a plating layer provided at an end of the first pipe body 21a or a pipe attached to an end of the first pipe body 21a. The second connection 22b is a plating layer provided at an end of the second pipe body 22a or a pipe attached to the end of the second pipe body 22a.

When the first connection 21b and the second connection 22b are plating layers, the first connection 21b and the second connection 22b can be easily provided at the ends of the first pipe body 21a and the second pipe body 22a. When the first connection 21b and the second connection 22b are tubes, the first connection 21b and the second connection 22b including a material other than stainless steel can be connected to the ends of the first pipe body 21a and the second pipe body 22a including stainless steel by in-furnace brazing.

(7) In one or more embodiments, one connection of the first connection 21b or the second connection 22b is a pipe, the other connection is a plating layer, the one connection and the one pipe body provided with the one connection are connected to each other by the first brazing material B1, the one connection and the other connection are connected to each other by the second brazing material B2, and the first brazing material B1 has a melting point higher than the second brazing material B2. Therefore, when the connection between the first pipe 21 and the second pipe 22 is disconnected for component replacement or the like, only the second brazing material B2 is melted by heating the connected portion between the first pipe and the second pipe at a temperature higher than the melting point of the second brazing material B2 and lower than the melting point of the first brazing material B1, and the connection between one pipe body and the pipe as one connection can be maintained. Thus, one connection can be reused to newly connect with the other connection.

(8) In one or more embodiments, one pipe of the first pipe 21 or the second pipe 22 constitutes a joint that connects the other pipe and another pipe 23 including stainless steel to each other. It is therefore possible to downsize the one pipe and easily perform an operation of providing a connection in the pipe body.

(9) In one or more embodiments, the coupling pipe 31 including a material whose main component is the same as main components of the materials of the first connection 21b and the second connection 22b is attached to the outer peripheral surface of at least one of the first pipe body 21a or the second pipe body 22a, and another pipe 32 including a material whose main component is the same as the main component of the material of the coupling pipe 31 is connected to the coupling pipe 31. Therefore, a functional component such as a sensor can be easily connected to the stainless pipe body via another pipe 32 including a material different from stainless steel.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST

1: REFRIGERATION APPARATUS
4: REFRIGERANT CIRCUIT
10A: REFRIGERANT PIPE
10B: REFRIGERANT PIPE
17: FOUR-WAY SWITCHING VALVE (SWITCHING MECHANISM)
21: FIRST PIPE
21a: FIRST PIPE BODY
21b: FIRST CONNECTION (FIRST CONNECTION PIPE)
22: SECOND PIPE
22a: SECOND PIPE BODY
22b: SECOND CONNECTION (SECOND CONNECTION PIPE)
23: THIRD PIPE
31: COUPLING PIPE
32: REFRIGERANT PIPE
B1: BRAZING MATERIAL
B2: BRAZING MATERIAL
X: ELEMENT COMPONENT

What is claimed is:

1. A refrigerant pipe that constitutes a refrigerant circuit of a refrigeration apparatus, the refrigerant pipe comprising:
   a first pipe; and
   a second pipe, wherein
   the first pipe comprises:
      a first pipe body, made of stainless steel; and
      a first connection, made of a material different from stainless steel, disposed at an end of the first pipe body in a pipe axial direction of the first pipe body,
   the second pipe comprises:
      a second pipe body, made of stainless steel; and
      a second connection, made of a material identical to the material of the first connection, disposed at an end of the second pipe body in a pipe axial direction of the second pipe body,
   the first connection is connected to the second connection,
   the second connection is a pipe,
   the second connection is connected to the second pipe body by a first brazing material,
   the second connection is connected to the first connection by a second brazing material,
   the first brazing material has a higher melting point than the second brazing material, and
   a portion of each of the first pipe body, the first connection, the second connection, and the second pipe body radially overlap one another.

2. The refrigerant pipe according to claim 1, wherein the first connection and the second connection are made of any of copper, a copper alloy, aluminum, or an aluminum alloy.

3. The refrigerant pipe according to claim 1, wherein the end of the first pipe body overlaps the end of the second pipe body in a pipe radial direction.

4. The refrigerant pipe according to claim 1, wherein the first connection is a plating layer disposed at the end of the first pipe body or is a pipe disposed at the end of the first pipe body.

5. The refrigerant pipe according to claim 1, wherein the second connection is a plating layer disposed at the end of the second pipe body or is a pipe disposed at the end of the second pipe body.

6. The refrigerant pipe according to claim 5, wherein
   the first connection is a plating layer disposed at the end of the first pipe body.

7. The refrigerant pipe according to claim 1, wherein
   the end of the first pipe body comprises a large diameter portion having a larger diameter than any other parts of the first pipe body, and
   the first connection is disposed on an inner peripheral surface of the large diameter portion.

8. The refrigerant pipe according to claim 1, wherein
the end of the first pipe body comprises a small diameter portion having a smaller diameter than any other parts of the first pipe body, and
the first connection is disposed on an outer peripheral surface of the small diameter portion.

9. The refrigerant pipe according to claim 1, wherein the first pipe constitutes a joint that connects the second pipe to another pipe made of stainless steel.

10. The refrigerant pipe according to claim 1, wherein at least one of the first pipe or the second pipe is part of an element component constituting a refrigerant circuit.

11. The refrigerant pipe according to claim 1, wherein
a coupling pipe, made of a material that includes a main component same as main components of the material of the first connection and the material of the second connection, is disposed on an outer peripheral surface of at least one of the first pipe body or the second pipe body, and
another pipe, made of a material that includes a main component same as the main component of the material of the coupling pipe, is connected to the coupling pipe.

12. The refrigerant pipe according to claim 1, wherein
the refrigeration apparatus comprises a four-way switching valve that switches a refrigerant flow path in the refrigerant circuit, and
the first pipe body or the second pipe body is connected to the four-way switching valve.

13. A refrigeration apparatus comprising:
the refrigerant pipe according to claim 1; and
an element component that constitutes a refrigerant circuit and to which the refrigerant pipe is connected.

14. A refrigerant pipe that constitutes a refrigerant circuit of a refrigeration apparatus, the refrigerant pipe comprising:
a first pipe; and
a second pipe, wherein
the first pipe comprises:
a first pipe body, made of stainless steel; and
a first connection, made of a material different from stainless steel, disposed at an end in a pipe axial direction of the first pipe body,
the second pipe comprises:
a second pipe body, made of stainless steel; and
a second connection, made of a material that includes a main component same as a main component of the material of the first connection, disposed at an end in a pipe axial direction of the second pipe body,
the first connection is connected to the second connection,
the second connection is a pipe,
the second connection is connected to the second pipe body by a first brazing material,
the second connection is connected to the first connection by a second brazing material,
the first brazing material has a higher melting point than the second brazing material, and
a portion of each of the first pipe body, the first connection, the second connection, and the second pipe body radially overlap one another.

15. The refrigerant pipe according to claim 14, wherein
the material of the first connection is different from the material of the second connection, and
a main component of the material of the first connection is a same as a main component of the material of the second connection.

* * * * *